US012794379B2

(12) United States Patent
Hui et al.

(10) Patent No.: US 12,794,379 B2
(45) Date of Patent: Nov. 10, 2026

(54) SYSTEM AND METHOD FOR STABILIZING A POWER DISTRIBUTION NETWORK

(71) Applicants: NANYANG TECHNOLOGICAL UNIVERSITY, Singapore (SG); VERSITECH LIMITED, Hong Kong (CN); SAN DIEGO STATE UNIVERSITY (SDSU) FOUNDATION, San Diego, CA (US)

(72) Inventors: Shu Yuen Ron Hui, Singapore (SG); Siew Chong Tan, Hong Kong (CN); Chunting Chris Mi, San Diego, CA (US)

(73) Assignees: NANYANG TECHNOLOGICAL UNIVERSITY, Singapore (SG); VERSITECH LIMITED, Hong Kong (CN); SAN DIEGO STATE UNIVERSITY (SDSU) FOUNDATION, San Diego, CA (US)

( * ) Notice: Subject to any disclaimer, the term of this patent is extended or adjusted under 35 U.S.C. 154(b) by 86 days.

(21) Appl. No.: 18/569,474

(22) PCT Filed: Jun. 23, 2022

(86) PCT No.: PCT/SG2022/050429
§ 371 (c)(1),
(2) Date: Dec. 12, 2023

(87) PCT Pub. No.: WO2022/271102
PCT Pub. Date: Dec. 29, 2022

(65) Prior Publication Data

US 2024/0313542 A1 Sep. 19, 2024

Related U.S. Application Data

(60) Provisional application No. 63/202,774, filed on Jun. 23, 2021.

(51) Int. Cl.
*H02M 7/797* (2006.01)
*H02M 1/00* (2006.01)
(Continued)

(52) U.S. Cl.
CPC ......... *H02M 7/797* (2013.01); *H02M 1/0048* (2021.05); *H02M 1/0058* (2021.05);
(Continued)

(58) Field of Classification Search
CPC ........ H02M 7/79; H02M 7/781; H02M 7/757; H02M 7/758; H02M 7/77; H02M 7/81;
(Continued)

(56) References Cited

U.S. PATENT DOCUMENTS

2013/0322139 A1 12/2013 Lee et al.
2019/0036335 A1 1/2019 Hui et al.
(Continued)

OTHER PUBLICATIONS

International Search Report of the International Searching Authority, issued in PCT/SG2022/050429, mailed Mar. 14, 2023; ISA/SG.
(Continued)

*Primary Examiner* — Nguyen Tran
(74) *Attorney, Agent, or Firm* — HARNESS, DICKEY & PIERCE, P.L.C.

(57) ABSTRACT

Disclosed is a system for stabilizing a power distribution network. The network is supplied at least partially by a renewable energy source. The system comprises a bidirectional AC-DC power conversion system between a supply side distribution network and a load side grid. for converting a supply side AC voltage, at a supply side frequency. to a load side DC voltage; a voltage regulator for regulating the load side DC voltage; and a supply side control loop comprising at least one of a frequency control loop and a voltage control loop for making a measurement of a respective one of the supply side frequency and supply side AC
(Continued)

voltage. and controlling bidirectional power transmission between the bidirectional AC-DC power conversion system and one or more DC loads connected to the load side grid. based on the measurement from the respective frequency control loop and/or voltage control loop.

20 Claims, 33 Drawing Sheets

(51) Int. Cl.
*H02M 1/12* (2006.01)
*H02M 7/81* (2006.01)
*H02J 3/16* (2006.01)
*H02J 3/32* (2006.01)

(52) U.S. Cl.
CPC ........... *H02M 1/007* (2021.05); *H02M 1/008* (2021.05); *H02M 1/12* (2013.01); *H02M 7/81* (2013.01); *H02J 3/16* (2013.01); *H02J 3/322* (2020.01)

(58) Field of Classification Search
CPC .. H02M 1/007; H02M 1/0067; H02M 1/0064; H02M 1/0083; H02M 1/02; H02M 1/04; H02M 1/045; H02M 1/042; H02M 1/0048; H02M 1/008; H02M 1/0058; H02M 1/12; H02M 1/15; H02M 1/10
See application file for complete search history.

(56) References Cited

U.S. PATENT DOCUMENTS

2020/0186043 A1* 6/2020 Park ........................ H01F 30/14
2020/0231057 A1 7/2020 Hishida et al.
2020/0335975 A1 10/2020 Kim et al.
2022/0109381 A1* 4/2022 Yenduri .............. H02M 7/4807
2022/0416684 A1* 12/2022 Awal ..................... H02M 7/219
2024/0136823 A1* 4/2024 Tamimi ..................... H02J 3/36

OTHER PUBLICATIONS

Liu, Dongqi et al. “Modeling and control of a V2G charging station based on synchronverter technology”, CSEE Journal of Power and Energy Systems, vol. 4, No. 3, Sep. 24, 2018 (Sep. 24, 2018), pp. 326-338, XP093264311, Issn: 2096-0042, DOI: 10.17775/CSEEJPES.2016.01430.

Chaudhry, Marium Jalal, “Enhancements in Micro-Grid Operation through Electric Vehicle Charging and Discharging”, 2020 9th International Conference on Industrial Technology and Management (ICITM), IEEE, Feb. 11, 2020 (Feb. 1, 2020), pp. 245-250, XP033764995, DOI: 10.1109/ICITM48982.2020.9080380 [retrieved on Apr. 27, 2020].

Mao, Meiqin et al. “Multi-Objective Power Management for EV Fleet With MMC-Based Integration Into Smart Grid”, IEEE Transactions on Smart Grid, IEEE, USA, vol. 10, No. 2, Mar. 1, 2019 (Mar. 1, 2019), pp. 1428-1439, XP011710374, Issn: 1949-3053, DOI: 10.1109/TSG.2017.2766363 [retrieved on Feb. 16, 2019].

Mahran, Quraan et al. “Design and control of battery charger for electric vehicles using modular multilevel converters”, IET Power Electronics, IET, UK, vol. 14, No. 1, Dec. 30, 2020 (Dec. 30, 2020), pp. 140-157, XP006116993, ISSN: 1755-4535, DOI: 10.1049/PEL2.12018.

Extended European Search Report of the European Patent Office, Application No. 228288916 mailed Apr. 17, 2025, 7 pages.

* cited by examiner

SYSTEM AND METHOD FOR STABILIZING A POWER DISTRIBUTION NETWORK

CROSS-REFERENCE TO RELATED APPLICATIONS

This application is a 371 U.S. National Phase of International Application No. PCT/SG2022/050429, filed on Jun. 23, 2022, which claims priority to U.S. Patent Application No. 63/202,774, filed Jun. 23, 2021. The entire disclosures of the above applications are incorporated herein by reference.

TECHNICAL FIELD

The present invention relates, in general terms, to systems and methods for stabilising a power distribution network. In particular, the present invention applies to power distribution networks supplied at least partially by a renewable energy source.

BACKGROUND

Power electronics converters are increasingly being connected to AC power systems with increasing renewable energy penetration. Much of the increase in demand for power electronics converters is directed at achieving the Paris Agreement under the framework of the United Nation on Climate Change. Intended to fulfil the requirements under the Paris Agreement, significant consideration has been given to increasing renewable energy generation and replacing combustion vehicles with electric vehicles.

Two technical hurdles must be overcome to achieve this. Firstly, replacing combustion vehicles with electric vehicles (EVs) is only meaningful if the EVs are charged by renewable energy. This means many existing multistorey car park buildings and other infrastructure buildings will need to be equipped with electric power infrastructure for EV charging. However, many such buildings lack the space for additional transformers for increasing power supply capacity. Secondly, in many countries solar energy is preferred because wind energy resources are limited—e.g. in Singapore. However, solar power generation is highly weather-dependent and intermittent in nature.

Moreover, power stations normally generate and step up the AC voltage to a high level (tens of kilo-volts to hundreds of kilo-volts) for power transmission.

This high AC voltage is stepped down to typically 6.6 kV-22 kV in the AC distribution lines before stepping down again by mains-frequency transformers into the AC mains voltage (230V per phase in Singapore) for use inside buildings. Existing methods to increase the power supply capacity in an existing building are either to replace the existing mains-frequency transformers with ones with higher power capacity or to install more mains-frequency transformers. However, as mentioned above, existing buildings such as multi-storey carparks normally do not have space for a larger transformer or to install more transformers.

For power system stability, it is essential to maintain instantaneous balance between power supply and load demand. With the increasing use of intermittent renewable energy resources, there is a need to change the control paradigm from "power supply following load demand" to "load demand following power supply".

Existing methods for meeting the power balance requirement include supply-side management (SSM), demand-side management and energy storage methods. SSM refers to actions taken to ensure the generation, transmission and distribution of energy are conducted efficiently. In the past, control of power generation was primarily carried out by controlling generators. Generators have relatively large inertia and thus a large time constant.

Demand-side management (DSM) has been adopted by power companies to reduce peak power. Traditional DSM technologies involve scheduling of delay-tolerant power demand tasks, real-time pricing and direct load control or on-off control of smart loads. However, these traditional methods have long response timeframes and cannot deal with instantaneous power balance of supply and demand.

In addition, many factors influence a user's decision to charge their EV. There is therefore a high level of randomness in the load curve including high demand outside of traditional peak power demand periods. This issue is only exacerbated with the increase in the number of EVs connecting to the grid.

It would be desirable to provide a new control paradigm and/or advanced technologies such as power electronic systems and energy storage systems to overcome or alleviate at least one of the above-described problems, or at least provide a useful alternative.

SUMMARY

The invention relates to a bidirectional AC-DC power converter and its control method for allowing bidirectional power flow between (i) the distribution network of an AC power system and (ii) a load side grid—e.g. a DC power grid such as a DC power grid inside a building for powering a large electric load with energy storage such as a large electric vehicle charging network or infrastructure.

Disclosed is a system for stabilizing a power distribution network supplied at least partially by a renewable energy source, comprising:

- a bidirectional AC-DC power conversion system between a supply side distribution network and a load side grid, for converting a supply side AC voltage, at a supply side frequency, to a load side DC voltage;
- a voltage regulator for regulating the load side DC voltage;
- a supply side control loop comprising at least one of a frequency control loop and a voltage control loop for making a measurement of a respective one of the supply side frequency and supply side AC voltage, and controlling bidirectional power transmission between the bidirectional AC-DC power conversion system and one or more DC loads connected to the load side grid, based on the measurement from the respective frequency control loop and/or voltage control loop.

The supply side control loop may comprise both the frequency control loop and the voltage control loop. The supply side control loop may be configured to draw power from the one or more DC loads into the grid to stabilise at least one of the supply side AC voltage and supply side frequency. The supply side control loop may comprise the voltage control loop and controls the supply side AC voltage by controlling reactive power generation of the bidirectional AC-DC power conversion system.

The supply side control loop may comprise the frequency control loop and controls the supply side frequency by controlling power consumption through the bidirectional AC-DC power conversion system.

The one or more loads may comprise electric vehicle batteries of respective one or more electric vehicles connected to the load side grid. The load side grid may comprise one or more microgrids each corresponding to a respective parking infrastructure building, each load of the one or more loads being a load in a respective parking infrastructure building.

The system may comprise, for each microgrid, a controller for controlling bidirectional power transmission to the microgrid. The system may further comprise a load side control distributor for separately controlling the controllers to manage bidirectional power transmission at each of the microgrids in accordance with one or more control conditions.

The system may comprise one or more controllers for controlling power conversion in the bidirectional AC-DC power conversion system. The bidirectional AC-DC power conversion system may be a bidirectional AC-DC modular multilevel converter (MMC).

The MMC may comprise:

a first stage, being a bidirectional AC-DC power conversion stage in communication with the supply side network, with controllable bidirectional power flow, in communication with the supply side control loop, for regulating one or both of supply side AC voltage and supply side frequency;

a second stage, being a bidirectional DC-AC power conversion stage in communication with the first stage, for performing voltage step-down for power flowing from the supply side network to the load side grid, and voltage step-up for power flowing from the load side grid to the supply side network;

a third stage, being a bidirectional AC-DC power conversion stage in communication with the second stage and load side grid, in communication with the voltage regulator for regulating the load side DC voltage feeding the one or more DC loads or drawing power from the one or more DC loads.

The system may further comprise a transformer system between the second stage and third stage for feeding an AC-voltage between the second stage and third stage depending on a power transmission direction through the MMC.

The first stage may comprise a plurality of multilevel power converters or modular multilevel converters.

The second stage may comprise a voltage-step-down power inverter. The second stage may comprise at least two voltage-step-down circuits.

The transformer system may comprise a plurality of secondary windings arranged in a polyphase to form one or more AC voltage sources for the third stage.

The system may further comprise a controller for reducing power imbalance over the first stage, second stage and third stage.

The frequency control loop and voltage control loop may measure the supply side frequency and supply side AC voltage, and provide active and reactive power compensation and control variation of load power consumption through the load side control loop to:

reduce instability in the supply side frequency and supply side AC voltage; or mitigate power fluctuations based on a power profile of the renewable source.

Also disclosed herein is a control method for controlling a system as set out above, comprising:

reducing transmission of power to the one or more loads if the supply side frequency, determined from a first measurement made by the frequency control loop, is less than a nominal mains frequency;

making a second measurement of the supply side frequency using the frequency control loop; and transmitting power from the one or more loads to the supply side network if the supply side frequency, determined from the second measurement, remains below the nominal mains frequency.

Also disclosed is a control method for controlling a system as set out above, comprising increasing power transmission to the one or more loads if the supply side frequency, determined from a measurement made by the frequency control loop, is higher than a nominal mains frequency.

Advantageously, embodiments of the present invention employ electric spring (ES) technology with a response time of milliseconds. Such ES technologies provide fast and real-time DSM solutions. In present applications, ES associated with smart loads can be distributed widely over low-voltage AC mains networks to absorb power fluctuations arising from intermittent renewable power generation.

BRIEF DESCRIPTION OF THE DRAWINGS

Embodiments of the present invention will now be described, by way of non-limiting example, with reference to the drawings in which.

DETAILED DESCRIPTION

The present disclosure relates to bidirectional power converters with ES functions. Flexible and modular methods disclosed herein have the potential to power EV charging infrastructures in multistorey car parks without mains frequency transformers. Such embodiments can use ES functions in the AC-DC power converter at the distribution voltage level to enable the DC power grid (herein interchangeably referred to as the load side grid), particularly DC grids with battery energy storage, to interact dynamically with the AC power grid at the distribution voltage level.

This dynamic interaction between the DC power grid and AC power grid at distribution voltage level achieves instantaneous power balance and hence system stability. Such systems can enable EV charging infrastructures, particularly large EV charging infrastructures with capacity to simultaneously charge more than 1000 EVs, to stabilise AC power grids relying on increasing intermittent renewable energy. Such flexibility is achieved via the presently proposed AC-DC converter and can be used to accelerate the adoption of large-scale renewable energy and EVs as a complimentary solution to combat climate change.

The functions of embodiments of the invention may therefore include: bidirectional power flow control between the distribution network of the AC power system and the DC grid inside the building without using the traditional mains-frequency transformers; electric spring functions (with active and reactive power compensation capability for regulating the distribution voltage and frequency) that allow the large load powered by the DC power grid to work as a new form of smart load that can consume power adaptively to follow the fluctuating power profile of renewable energy generation (such as wind and solar power), thereby enabling the smart load to absorb power fluctuations arising from increasing renewable energy generation in the power generation infrastructure; and high AC voltage (typically 6.6 kV-11 kV or 6.6 kV-22 kV) to relative low DC voltage (typically 500V-800V) conversion capability. Embodiments of the invention provide a technical solution to use the modular power-electronics-based bidirectional AC-DC power converter to create a DC voltage of typically 500V-800V (for use as a DC power grid in the building) from the 6.6 kV-22 kV AC distribution lines. This solution does not need bulky mains-frequency transformers. Because the proposed modular approach enables the power capacity of the AC-DC power converter to scale up or down by selecting the number of power converter modules according to the power demand (such as the number of chargers inside a multi-storey carpark), embodiments of the invention offer the power company a flexible solution to expand the power supply capacity in existing buildings, particularly for powering large EV charging infrastructure with power up to tens of Mega-Watts.

Figure 1A:
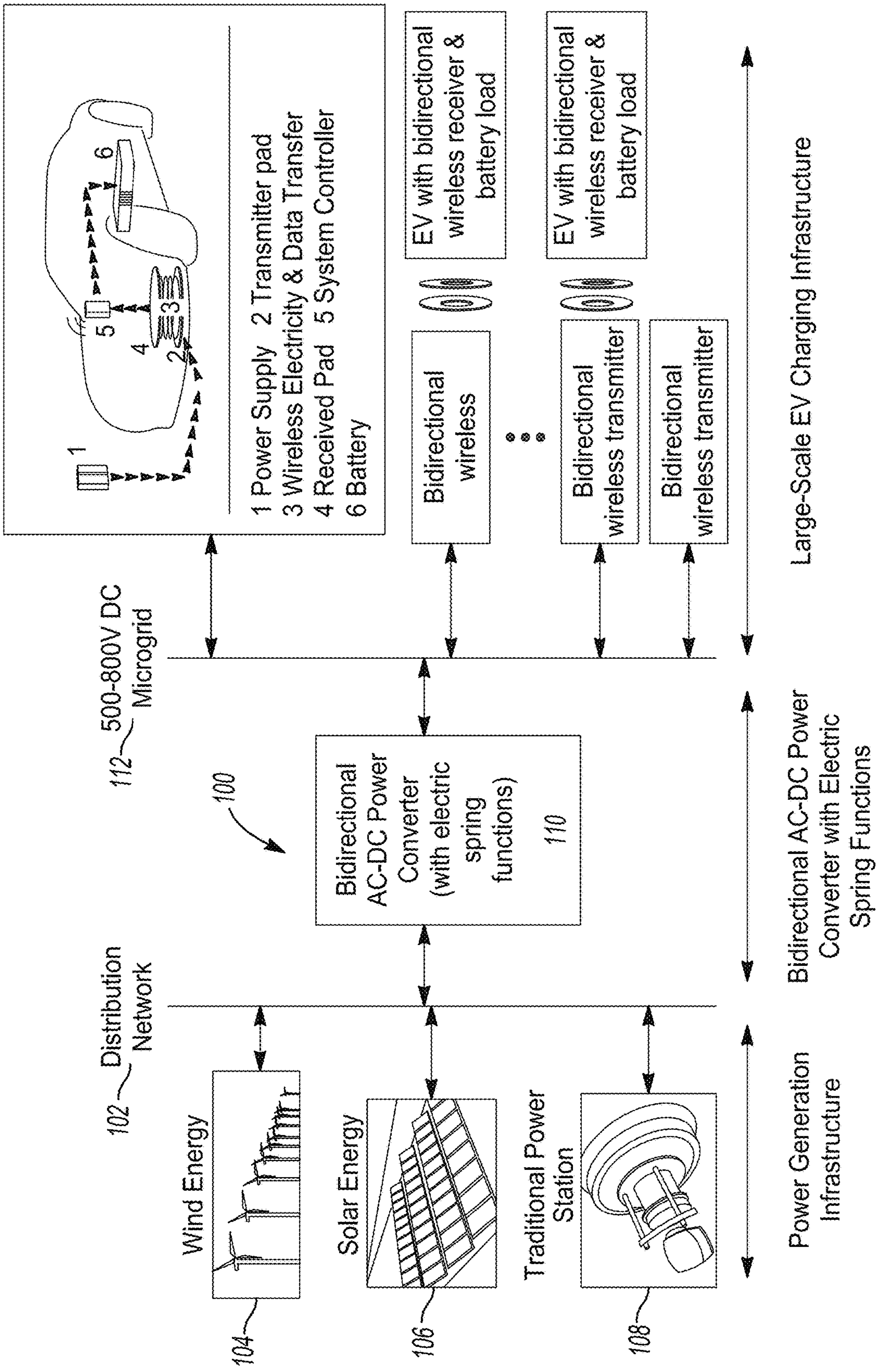
FIG. 1*a* is a schematic of the present bidirectional AC power converter with electric spring function, linking AC distribution lines of an AC power system to the voltage link of a DC power grid.

Such an AC-DC converter is incorporated into the system 100 of FIG. 1*a*. The system 100 stabilises a power distribution network 102 (typically at AC voltage of 6.6 kV-11 kV or 6.6 kV to 22 kV) supplied at least partially by a renewable energy source (which may include wind 104 and solar 106). The power distribution network 102 may also be supplied by traditional generator based power generation 108. Thus embodiments of the invention use power electronics circuits such as multilevel power inverters and modular multilevel converters (MMCs) for handling high-voltage DC transmission (HVDC) and Flexible AC Transmission (FACT) in power systems. FIG. 1*a* is one such embodiment, illustrating the core concept of using a bidirectional MMC to link AC distribution lines of a power system 102 with a mixture of intermittent renewable and traditional energy sources 104, 106 and 108. Moreover, the MMC of FIG. 1*a* uses a MMC with electric spring functions, which are not available in pre-existing MMCs.

The system 100 includes a bidirectional AC-DC power conversion system 110. The AC-DC power conversion system 110 presently includes ES functions. Moreover, the AC-DC power conversion system 110 sits between a supply side distribution network 102 and a load side grid 112 (which may comprise one or more regulated DC voltage sources), and converts a supply side AC voltage, at a supply side frequency, to a load side DC voltage. Presently, the load side grid 112 is referred to as a microgrid but is not limited to any form of DC grid.

Figure 1B:
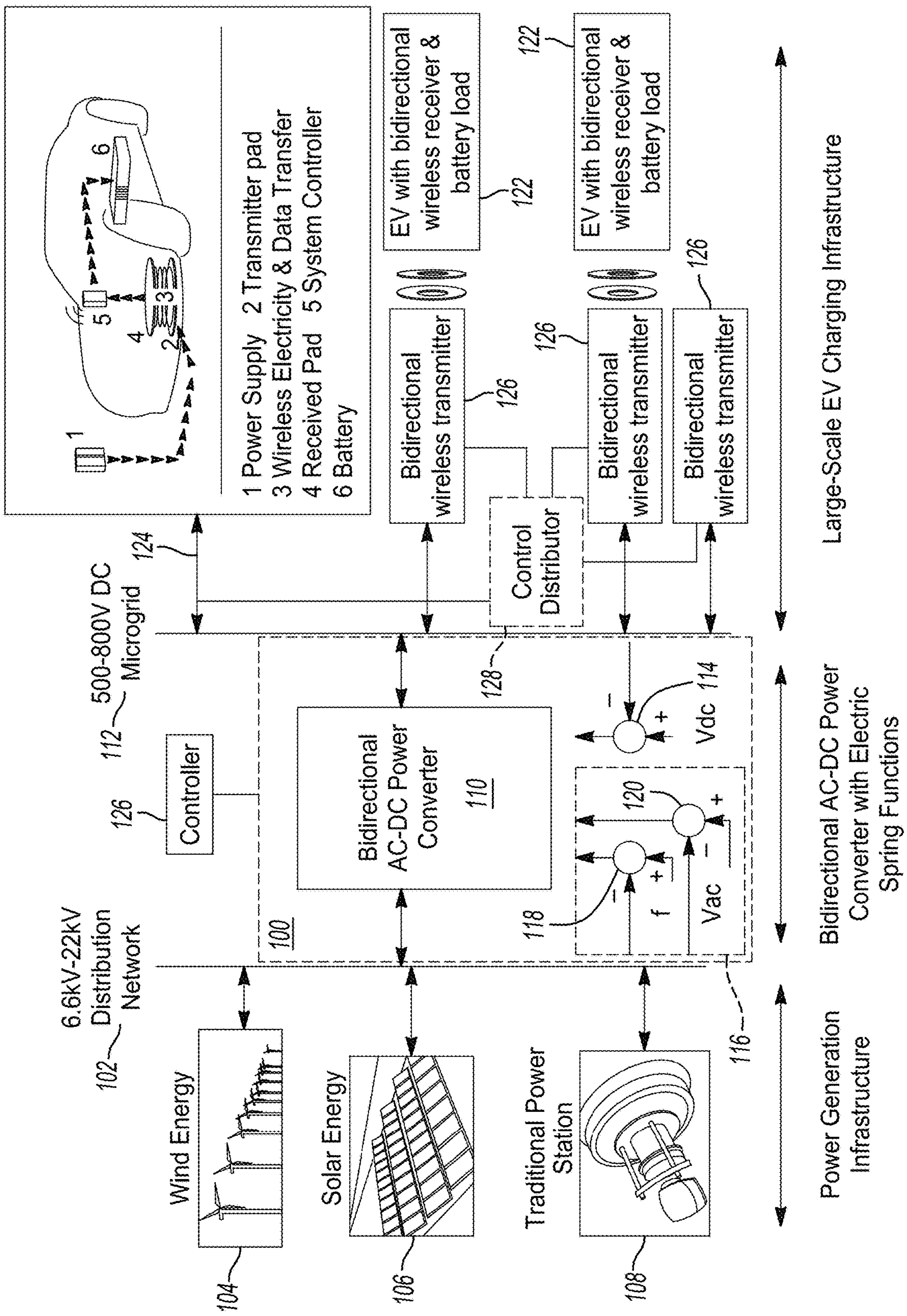
FIG. 1*b* is a schematic of the present bidirectional AC power converter linking AC distribution lines of an AC power system to the voltage link of a DC power grid, in which the control loop is emphasised.

With reference to FIG. 1*b*, in which the same reference numerals are used for the same features, the system 100 also includes a voltage regulator 114 for regulating the load side DC voltage, and a supply side control loop 116. The supply-side control loop 116 includes a frequency control loop 118 and a voltage control loop 120. In some embodiments, the bidirectional AC-DC power conversion system may only include one of the frequency control loop 118 and voltage control loop 120.

The control loops 118, 120 make respective measurements of the supply side frequency and supply side AC voltage, and control bidirectional power transmission between the bidirectional AC-DC power conversion system 110 and at least one, and preferably many, DC load 122 connected to the load side grid 112. Control is exercised based on the measurement from the respective frequency control loop 118 and/or voltage control loop 120. If the frequency of the power distribution network is less than the nominal mains frequency, indicating that the power supply is less than load demand, the system can perform demand response functions by first reducing the load power consumption, and if the mains frequency remains lower than its normal value (e.g. f* in Equation (6)), by reversing the power flow from the energy storage on the load side to the AC distribution network in order to reduce mains frequency deviation. Similarly, if the frequency of the power distribution network is higher than the nominal mains frequency, indicating that the power supply is higher than load demand, the system can perform demand response functions by increasing the load power consumption or transferring more energy to the energy storage (such as batteries) on the load side in order to reduce mains frequency deviation. Where a DC load 122 is an EV, connection to the microgrid 112 may occur in various forms including a hard wired connection 124 and wireless transmission 126. Similarly, any load on the microgrid 112, such as an EV or group of loads such as a car park incorporating EV charging infrastructure, may perform wired or wireless transfer of energy to/from the bidirectional AC-DC power converter 110 over the microgrid 112.

The ES system 100 can be connected to the 6.6 to 22 kV distribution voltage network 102. In contrast, ESs have historically been connected to low-voltage AC mains voltage (typically 110 V at 60 Hz or 220 to 240 V at 50 Hz).

The ES system 100 can employ one or more bidirectional AC-DC MMCs and multilevel converters (MLCs), such as those set out herein, to make use of dual active bridges (DABs) enabling them to be associated with a 500 to 800 V DC power grid 112. Such a grid 112 is suitable for powering large EV charging infrastructure with both EV batteries and second-life batteries. This is to be contrasted with traditional ESs that have been primarily based on two-level inverters associated with non-critical loads. Semiconductor switches can only withstand a limited voltage rating, meaning previous two-level voltage source inverters for low-voltage ES are unsuitable for medium voltage distribution systems. The present MMC and MLC typologies disclosed herein tackle this problem.

The frequency control loop 118 and supply-side AC voltage control loop 120 facilitate the ES functions and embed them on the AC side of the bidirectional MMC to turn the DC-grid-power EV charging infrastructure into a form of smart load that can consume energy from or deliver energy to the AC power system at the distribution level—i.e. balance power generation and load demand in a power system. Such systems can be used with hundreds of ES-based EV charging infrastructures in multistorey car parks to help support and stabilise the power grids of megacities that have experienced a significant amount of renewable energy penetration. The power fluctuations caused by increasing wind and solar power generation can therefore be absorbed by this smart load. These two advantageous features can accelerate the adoption of electric vehicles and renewable energy—as a complementary solution to combat climate change. In other words, the frequency control loop 118 and the voltage control loop 120 measure the supply side frequency and supply side AC voltage, and provide active and reactive power compensation and control variation of load power consumption through the load side control loop to reduce instability in the supply side frequency and supply side AC voltage or to mitigate power fluctuations based on a power profile of the renewable source.

Figure 1C:
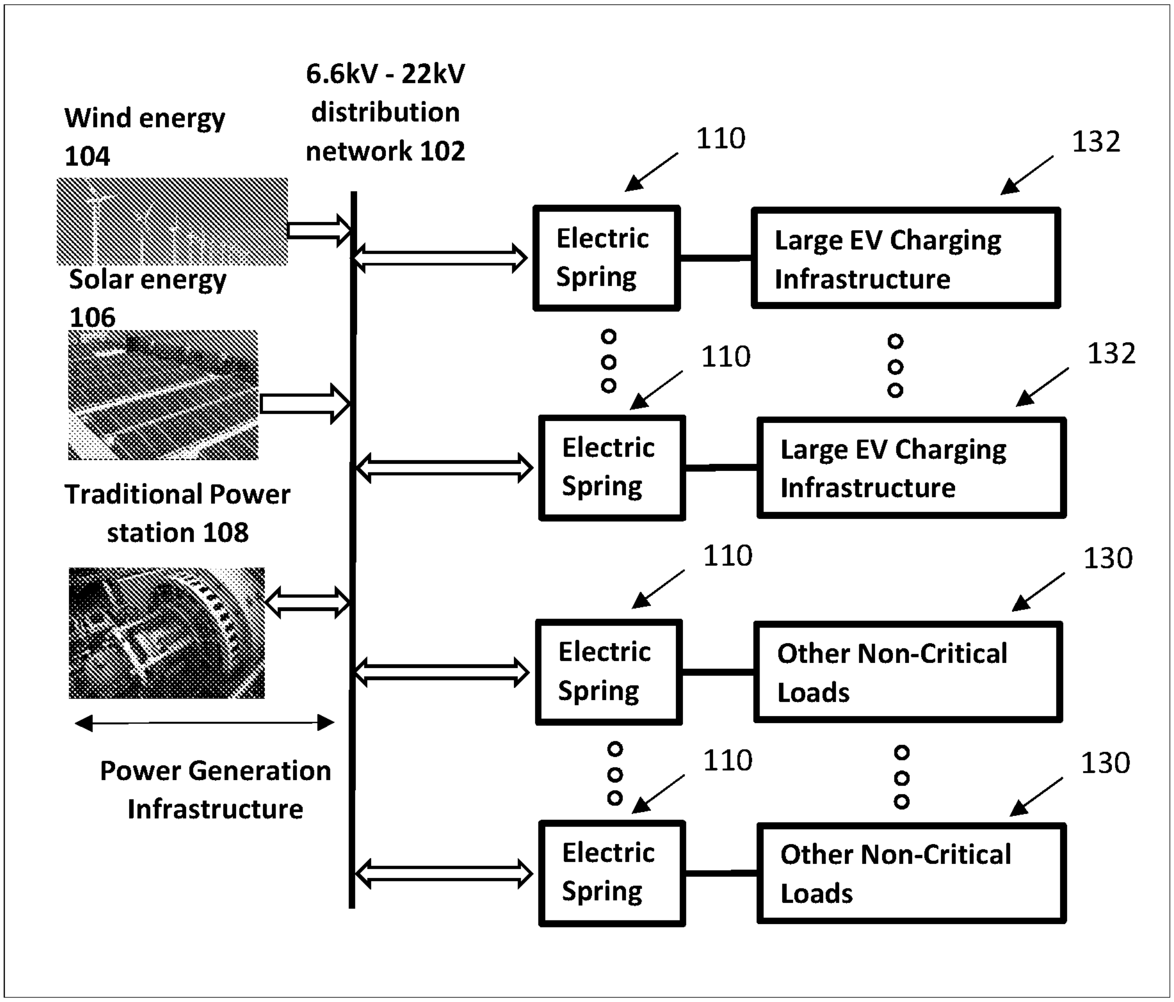
FIG. 1*c* shows a distribution network connected to a plurality of the bidirectional AC power converters according to FIG. 1*b;*

Such an arrangement is illustrated in FIG. 1*c*, in which the power distribution network 102 is connected to multiple ESs each in the form of bidirectional power converter 110 of FIG. 1*b*, and each of which powers a separate non-critical load 130 or EV charging infrastructures 132. The incorporation of ES functions into MMC circuits enables control of active and reactive power compensation for mains-frequency and mains-voltage regulation for the AC power system at the distribution level. Thus, the system 102 of FIG. 1*b* can be used to control demand from large EV charging infrastructure to neutralise problems arising from renewable energy generation. In particular, the system 102 can be used as an ES system to stabilise the AC power system supplied at least partially by intermittent renewable energy sources.

Figure 2A:
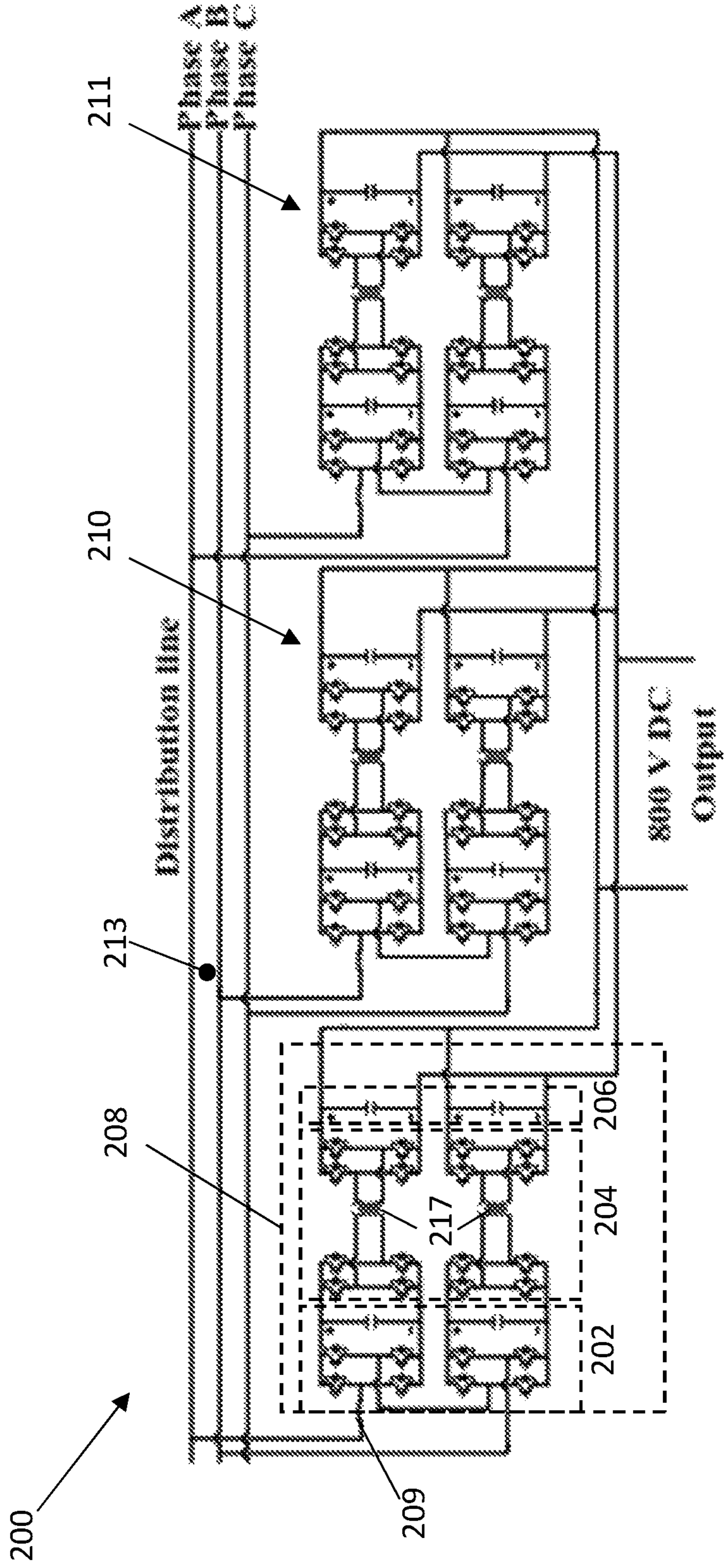
FIG. 2*a* is an example of a modular multilevel converter used as the front-end power converter in a system such as the bidirectional AC power conversion system of FIG. 1*b;*

FIG. 2*a* shows an MMC circuit 200. The MMC circuit 200 comprises (202) a front-stage AC-DC MMC, (204) intermediate DC-AC power converter and (206) a third AC-DC power converter to create the voltage source for the DC power grid (which, again, can be referred to as a microgrid or load side grid unless context dictates otherwise). The first phase 202 (interchangeably referred to as the first stage, front-stage, front-end and other terms as dictated by context) is a bidirectional AC-DC power conversion stage. The first phase 202 has (i) electric spring functions for providing active and/or reactive power compensation dynamically to maintain the stability of the AC input voltage and frequency and (ii) with bidirectional power flow control and (iii) with input power factor control. The first stage can therefore be formed of multilevel power converters or modular multilevel converters. The first phase 202 is in communication with the supply-side network 213 and supply-side control loop—e.g. loop 118 and/or loop 120 in FIG. 1*b*—for regulating one or both of supply-side AC voltage and supply-side frequency. The second phase 204 (which can be referred to using similar interchangeable terms as those used for the first phase, such as the second power stage) is a bidirectional DC-AC power conversion stage in communication with the first stage 202. The second power stage 204 can be formed by one or more DC-AC power converters (i) with voltage-stepped-down functions and (ii) with medium-frequency (e.g. tens of kilo-Hertz) isolation transformers with voltage-stepped-down turns ratio for providing medium-frequency significantly reduced voltage in the secondary windings of these isolation transformers. The second power stage 204 performs voltage step-down for power flowing from the supply-side network to the load side grid. To that end, in some embodiments the second bidirectional DC-AC power stage 204 can be formed of a voltage-step-down power inverter, such as a half-bridge power inverter, as a power module for generating a medium-frequency voltage across the primary winding of an electrical isolation transformer with a voltage-step-down turns ratio, whereas the medium frequency is typically in the range of 800 Hz to 100 KHz. For larger voltage step-down, the system uses at least two voltage-step-down mechanisms in the second DC-AC power conversion stage 204 to step down the high input AC voltage of mains frequency into a relatively low AC voltage of medium-frequency. Conversely, when current is flowing in the opposite direction the second phase 204 performs a voltage step-up for power flowing from the load side grid to the supply-side network.

In some embodiments the isolation transformer of the second phase 204 has secondary windings forming the AC voltage sources for the third AC-DC power conversion stage 206. One secondary winding can feed an AC-DC power converter (or active rectifier) or a plurality of secondary windings arranged in a polyphase to form one or more AC voltage sources. The third stage 206 (again referable to using similar terms as those above, such as the third power stage) of AC-DC power conversion may be formed by feeding the medium-frequency and reduced voltages of the secondary windings to their corresponding bidirectional rectifiers to provide one regulated common DC voltage source or multiple regulated DC voltage sources for the load side grid 215, whereas the secondary windings can be configured in individual, in star, in delta or other form for feeding the rectifiers. The third stage 206 may be a bidirectional AC-DC power conversion stage in communication with the second stage 204 and load side grid 215. The third stage 206 is also in communication with the voltage regulator for regulating the load side DC voltage feeding the one or more DC loads or drawing power from the one or more DC loads. As a result of the above, the AC input of the system is the distribution voltage of the AC power system and the DC output of the system is the regulated DC voltage or voltages for the DC power grid feeding the electric loads.

A transformer system is arranged between the second stage 204 and the third stage 206 for feeding an AC-voltage between the second stage 204 and the third stage 206 depending on a power transmission direction through the MMC. The transformer system comprises a plurality of secondary windings arranged in a polyphase to form one or more AC voltage sources for the third stage 206.

The intermediate DC-AC power converter 204 of the embodiment shown in FIG. 2*a* comprises a medium-frequency isolation transformer. The transformer is used for voltage reduction in the intermediate stage 204. The intermediate stage 204 presently makes use of DABs.

FIG. 2*a* includes multiple MMC modules 208, 210 and 211. In some embodiments, a single module may be used. In particular, the number of modules is determined by the distribution line voltage and voltage ratings of the power conversion devices. In some embodiments, silicon-based insulated-gate bipolar transistors or SiC devices can be used for MMC implementation. In the intermediate DC-AC stage 204, a medium-frequency power inverter turns the DC voltage into a medium-frequency AC voltage through a stepdown isolation transformer 217. The stepdown secondary AC voltage outputs of the isolation transformer 217 are converted into a DC voltage in the final stage AC DC power converter. The three DC voltage output in FIG. 2*a* can be connected in parallel to form one DC voltage for the DC power grid 215.

Each module 208, 210, 211 connects a respective pair of phases of the AC power network to the DC power grid 215. Each module 208, 210, 211 includes an inductor and full-bridge inverter with an output capacitor for power-factor-correction (PFC) front-end power conversion in the first phase 202.

The modular feature of the MMC enables a power supply capability to be flexibly expanded for DC-grid-power EV charging infrastructure according to parking capacities in multistorey car park buildings and other infrastructure buildings, without using mains-frequency transformers.

With further reference to the MMC 200 of FIG. 2*a*, AC-DC PFC power conversion will now be considered with respect to the first stage 202. The AC-DC first stage 202 is a cascaded full-bridge rectifier. It supports bidirectional power flow as required for achieving ES functions. The number $N_{HB}$ of the full-bridge modules is determined by the voltage level of the distribution network.

$N_{HB}$ can be calculated by:

$$N_{HB} = \frac{\sqrt{2}\,V_g}{uV_{sw,max}} \tag{1}$$

where $V_g$ is the line-to-line rms voltage of the distribution network; $V_{SW,max}$ is the maximum voltage that each semiconductor switch can bear; u is the utilisation rate of the voltage rating of semiconductor switches and satisfies u≤1. For a 6.6 kV grid voltage (i.e. $V_g$=6.6 kV) the value of $V_{SW,max}$ is listed in Table 1 below in which u=55% and $N_{HB}$=1,2, and 3.

Required Voltage Ratings of Switches for Å 6.6 KV Power Grid

TABLE 1

| | |
|---|---|
| $V_g$ | 6.6 kV |
| u | 55% |
| $V_{sw,\,max}$ when $N_{HB}$ = 1 | 16.9 kV |
| $V_{sw,\,max}$ when $N_{HB}$ = 2 | 8.49 kV |
| $V_{sw,\,max}$ when $N_{HB}$ = 3 | 5.7 kV |

Table 1 indicates that three full-bridge modules are needed in the rectifier with 6500 fault insulated-gate bipolar transistors, or two modules are needed with a 10 kV silicon-carbide metal-oxide-semiconductor field-effect transistor (SIC MOSFET).

Figure 5:
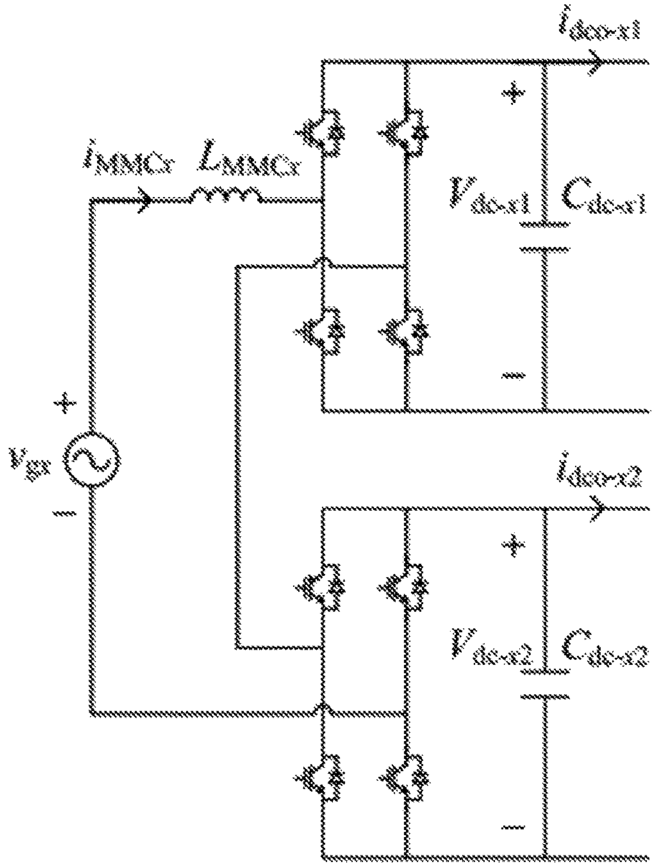
FIG. 5 shows cascaded two H-Bridge active rectifier of Phase x in the MMC system of FIG. 2*a;*

In the examples set out below, in testing the system of FIG. 2*a*, an operating frequency of 20 kHz is chosen for the switches. In FIG. 5, x=(AB, BC, CA) denotes the phases of the power grid to which the rectifier is connected. For example, x=AB means that the rectifier is connected to Phase-A and Phase-B lines. $v_{gx}$ and $i_{MMCx}$ represent the input voltage and current of the rectifier, respectively; $V_{dc\text{-}x1}$ and $V_{ac\text{-}x2}$ are the DC-Link voltages of the two full-bridge modules of the rectifier; $i_{dco\text{-}x1}$ and $i_{dco\text{-}x2}$ denote the upper currents of the two modules. The rectifier parameters are listed in Table 2.

Specifications of the Cascaded Full-Bridge Rectifiers

TABLE 2

| | |
|---|---|
| $C_{dc\text{-}xi}$ (x = AB, BC, CA; i = 1, 2) | 500 μF |
| $V_{dc\text{-}xi}$ (x = AB, BC, CA; i = 1, 2) | 5.2 kV |
| $L_{MMCx}$ (x = AB, BC, CA) | 30 mH |
| $V_{gx}$ (x = AB, BC, CA) | 6.6 kV (50 Hz) |
| Switching Frequency | 20 kHz |

Figure 2B:
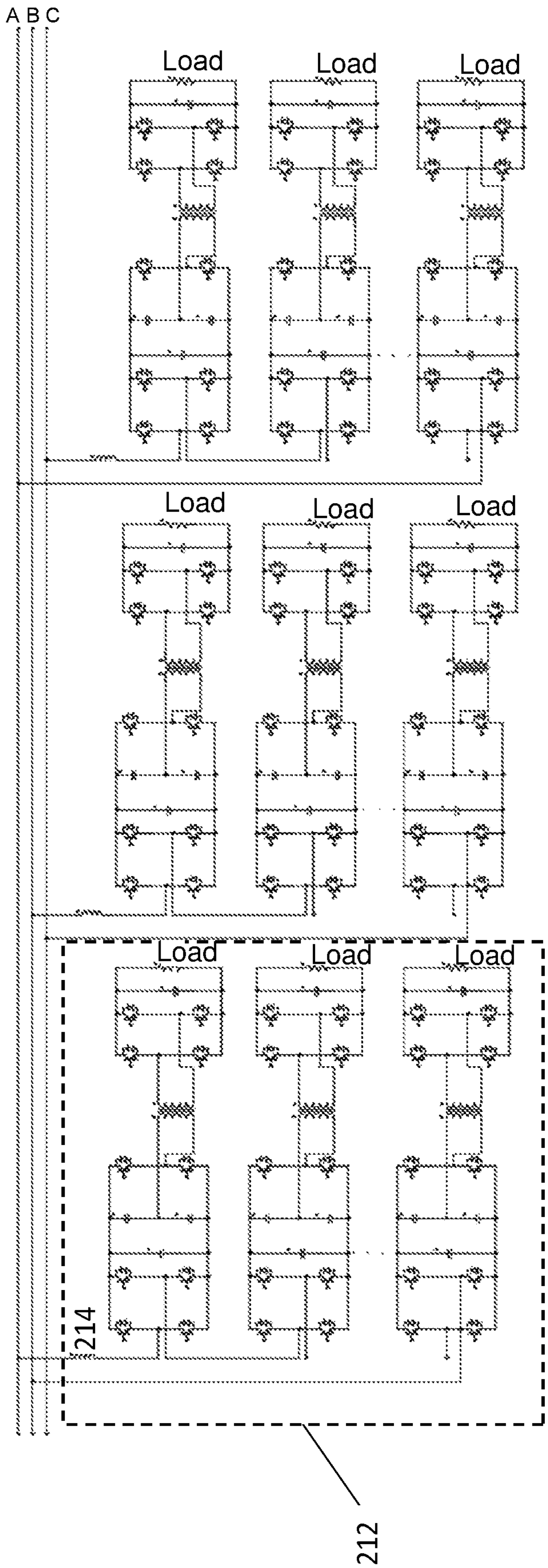
FIG. 2*b* is an extended embodiment of the circuit in FIG. 2*a;*
Figure 2C:
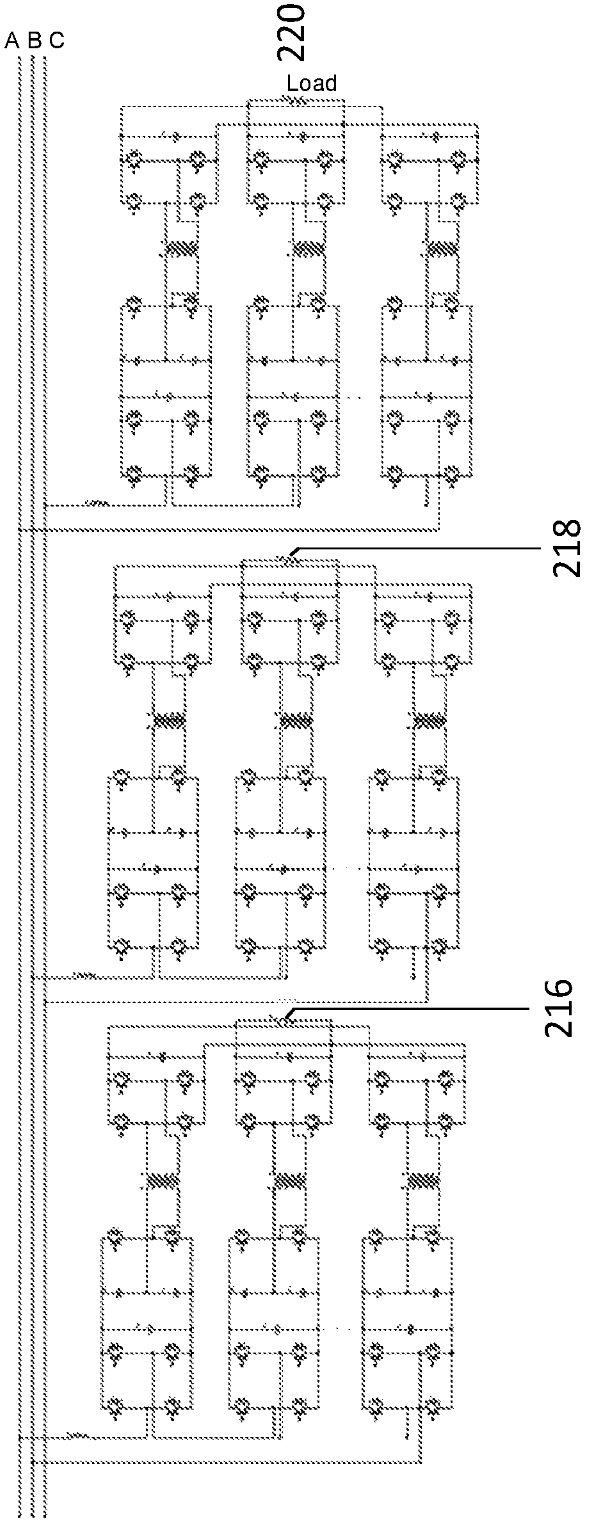
FIG. 2*c* shows an implementation example of an embodiment of the invention.

A further example embodiment is shown in FIG. 2*b* in which a plurality of full inverter bridges modules (one example referenced with numeral 212) are connected in series to form one MMC for each phase. For ease of illustration, only three full inverter bridges modules are shown in FIG. 2*b*. The number of modules (N) depends on the magnitude of the input AC voltage and the voltage ratings of the power converter modules. Therefore, while the embodiment of FIG. 2*a* includes two modules for each phase and the embodiment of FIG. 2*b* includes a plurality of modules for each phase, any number of modules may be used in such a modular structure to achieve the desired voltage reduction. With further reference to FIG. 2*a*, an input inductor 209 is used with the MMC to form the first power stage of AC-DC power converter with bidirectional power flow, power factor control and (electric spring) power compensation capabilities. For each module of the MMC, the DC capacitor voltage (C1) forms the input DC voltage for the second-stage DC-AC power converter with the half-bridge inverter and the medium-frequency isolation transformer offering their respective voltage-step-down functions. The reduced voltage of the secondary winding of the isolation transformer forms the input of the third power stage of medium-frequency AC-DC power converter (an active rectifier). In the third stage the DC voltage output is regulated to the desired value for the DC power grid. In the example of FIG. 2*b*, the regulated DC voltage outputs can (i) stay as individual DC voltage sources, (ii) be linked together to form one common DC voltage source for the DC power grid, or (iii) be grouped together to form several common DC voltage sources for the DC power grid. As an example of case (iii), the DC output voltage sources are grouped together into three common DC voltage sources 216, 218, 220 in FIG. 2*c*. If necessary, some of DC voltage sources can be converted into mains voltage for power AC electric loads while the other DC voltage sources are used to power the DC electric loads such as EV chargers.

Figure 2D:
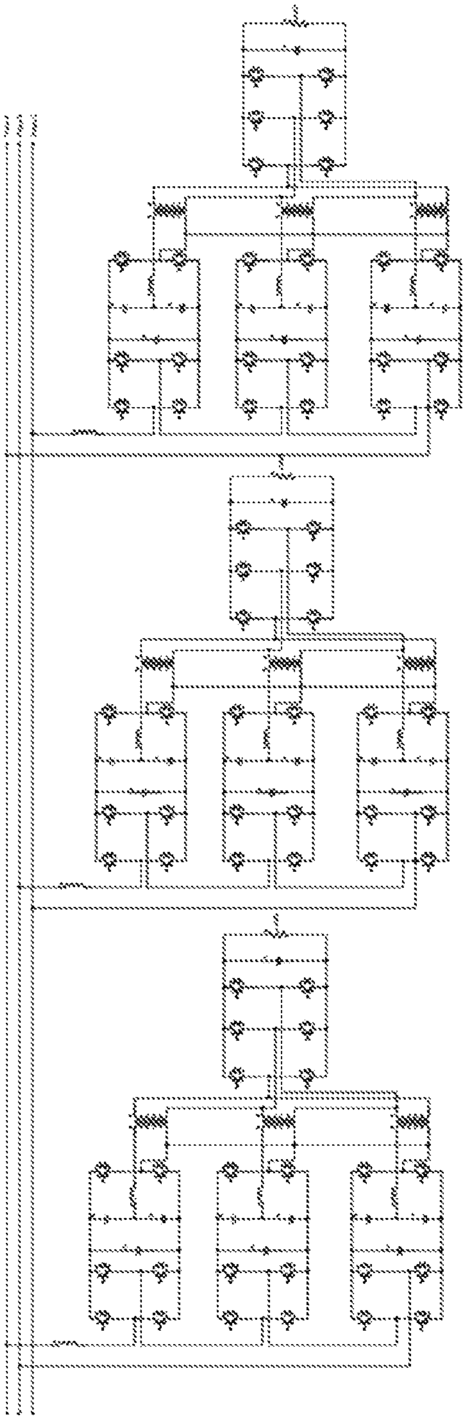
FIG. 2*d* is an implementation example of MMC with the secondary windings arranged to feed a bidirectional AC-DC power converter in the third power stage.

The present design is flexible in that there are various configurations of the third power stage that can be used to form the medium-frequency AC-DC power converter with regulated DC output voltage. FIG. 2*d* shows another implementation example similar to that in FIG. 2*b*, except that the secondary windings are configured in star-delta form to feed a bidirectional active rectifier in each module. The implementation example of the MMC in FIG. 2*d* is similar to that of FIG. 2*b*, except that the secondary windings are arranged to feed a bidirectional AC-DC power converter in the third power stage. Notably, in each of FIGS. 2*b* and 2*d* the output DC voltage sources have the flexibility to stay as individual voltage sources, or to be linked together to form one common voltage source, or to be grouped to form more than one DC voltage source.

Figure 2E:
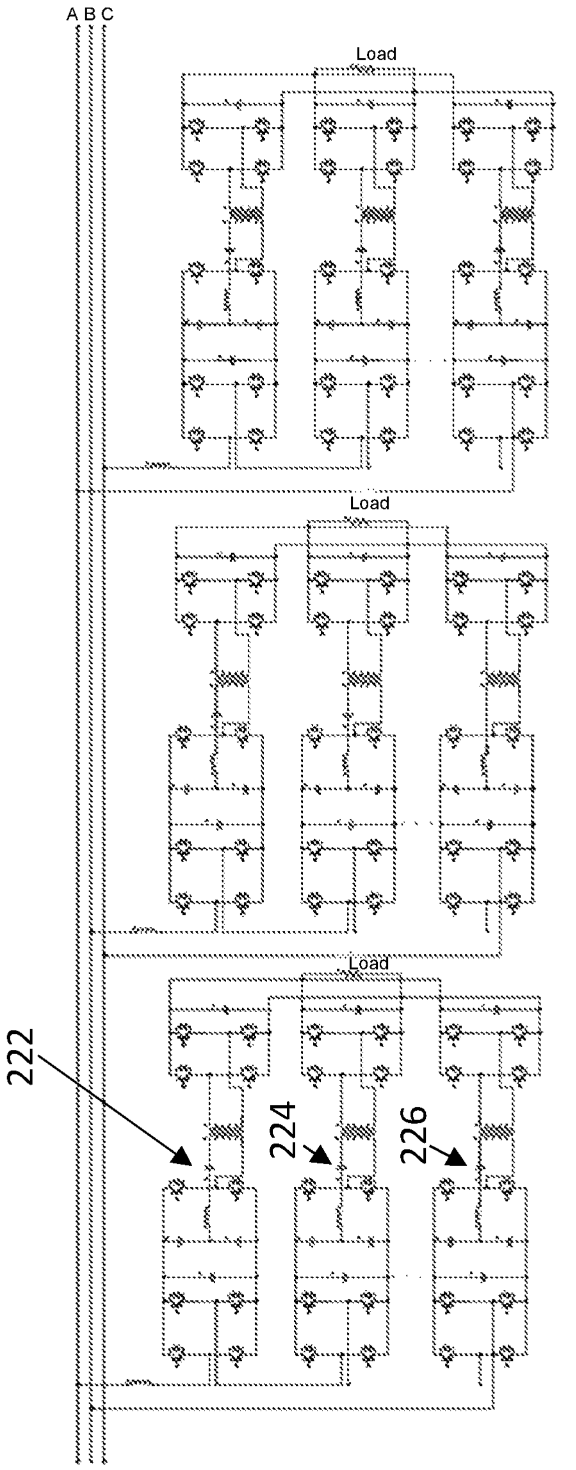
FIGS. 2*e* and 2*f* are further implementations in which a series capacitor is added to the primary winding of each isolation transformer.
Figure 2F:
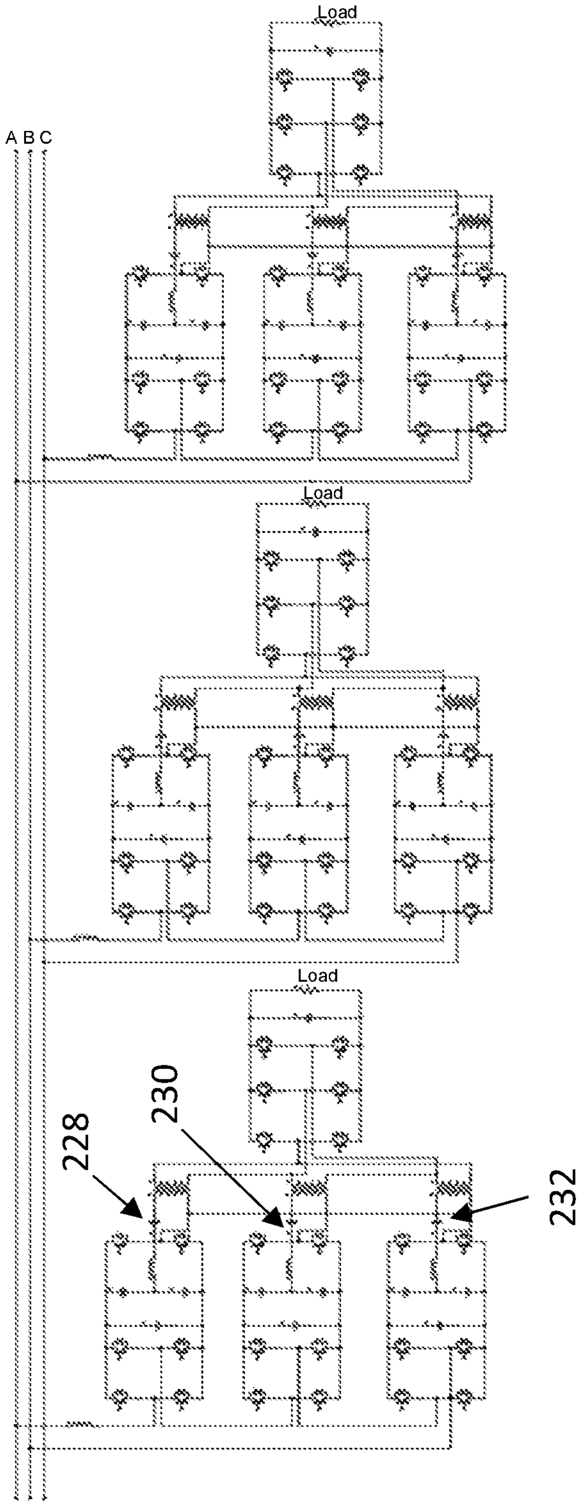
Figure 2G:
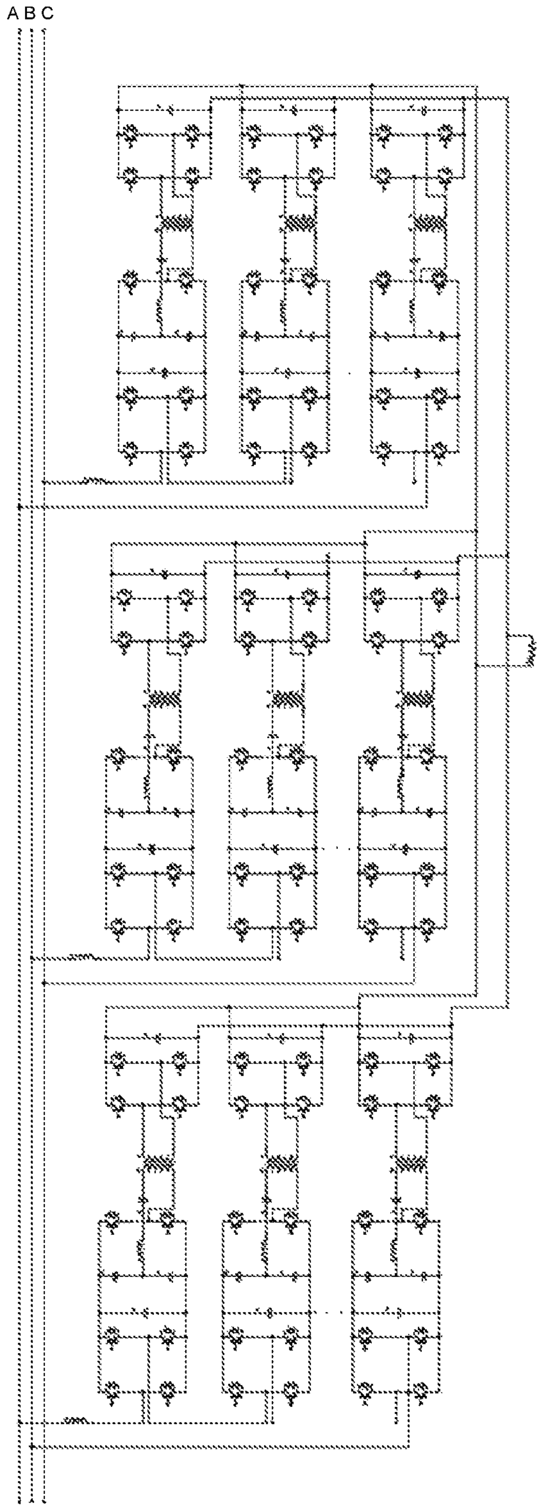
FIG. 2*g* illustrates an example embodiment in which all DC output voltage sources form one common DC voltage source.

A series capacitor 222, 224, 226 can be added to the primary winding of each isolation transformer (e.g. 217 in FIG. 2*a*) to filter power harmonics and reduce magnetic core losses as shown in FIG. 2*e* and FIG. 2*f* (for series capacitors 228, 230, 232). Resonant switching techniques can be incorporated in order to achieve soft-switching in the power switches of the power converters in the three power stages. FIG. 2*g* shows one example consistent with an embodiment of the invention with all the DC output voltage sources forming one common DC voltage source for the DC power grid.

Figure 6:
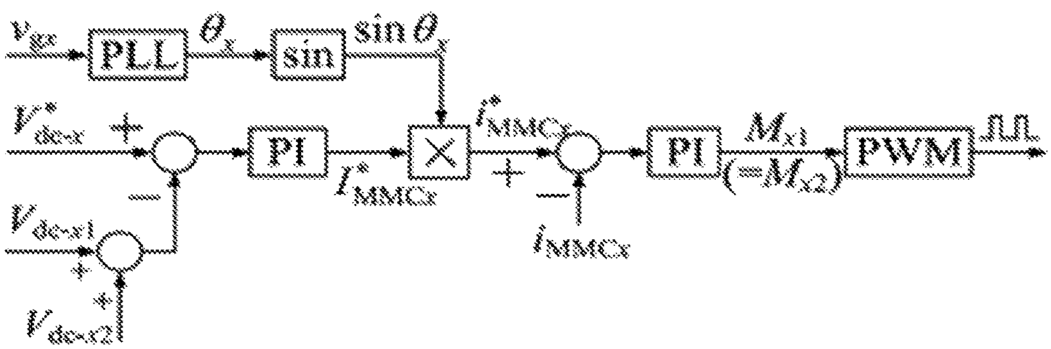
FIG. 6 is a block diagram of the voltage and current control of the AC-DC active rectifier.

FIG. 6 shows the control block diagram for the cascaded full-bridge rectifier. Firstly, the difference between the sum of the DC-link voltages ($V_{dc\text{-}x1}$ and $V_{dc\text{-}x2}$) and its setpoint value $V^*_{dc\text{-}x}$ is processed by the PI controller to produce the magnitude reference $I^*_{MMCx}$ of the MMC current, i.e.:

$$I^*_{MMCx} = k_{p1}(V^*_{dc-x} - V_{dc-x1} - V_{dc-x2}) + k_{i1}\int (V^*_{dc-x} - V_{dc-x1} - V_{dc-x2})dt \tag{2}$$

Next, the phase information $\theta_x$ of the grid voltage $V_{gx}$ extracted with the phase-lock to loop (PLL). By multiplying $I^*_{MMCx}$ and $\sin\theta_x$, the reference $i^*_{MMCx}$ of the MMC current is obtained. Then, the error between the MMC current $i_{MMCx}$ and its reference $i^*_{MMCx}$ is processed with a PI controller to obtain the modulation indices $M_{x1}$ and $M_{x2}$, i.e.

$$M_{x1} = M_{x2} = k_{p2}(i^*_{MMCx} - i_{MMCx}) + k_{i2}\int (i^*_{MMCx} - i_{MMCx})dt \tag{3}$$

Finally, $M_{x1}$ and $M_{x2}$ modulated into pulses to control the switching patterns of the two full-bridge modules, respectively.

Figure 7:
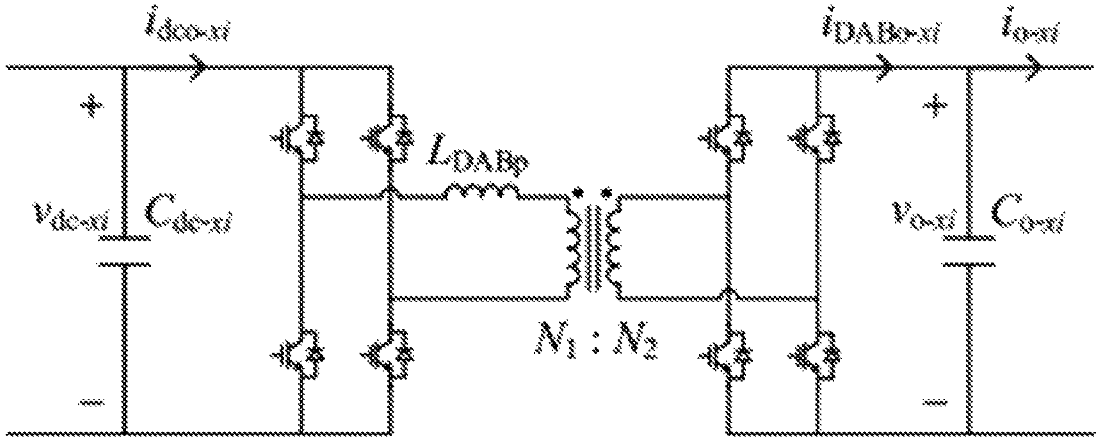
FIG. 7 is the $i^{th}$ dual active bridges (DAB) module of Phase x in the MMC system.

The DC-AC-DC stage is a DAB utilising two full bridges at both the primary and secondary sites. The output of each full-bridge module of the rectifier is connected to a DAB module, as shown in FIG. 7. Here, $i_{DABo\text{-}xi}$ denotes the output current of the secondary-side full bridge. $V_{0\text{-}xi}$ and $i_{0\text{-}xi}$ are the output voltage and current in the DAB module respectively. The ratio of turns of the transformer is $N_1$:$N_2$. The circuit structure of FIG. 7 supports reversible power flow and provides galvanic isolation. The parameters of the DAB module are listed in Table 3.

Specifications of the DAB Module

TABLE 3

| | |
|---|---|
| Rated power | 25 kW |
| $V_{0\text{-}xi}$(x = AB, BC, CA; i = 1, 2) | 800 V |
| $C_{0\text{-}xi}$ (x = AB, BC, CA; i = 1, 2) | 2000 µF |
| Turn's ratio of the transformer | 7:1 |
| $L_{DABp}$ (including the leakage inductance of the transformer) | 7 mH |
| Magnetizing inductance of the transformer | 50 mH |
| Switching frequency | 20 kHz |

Figure 8:
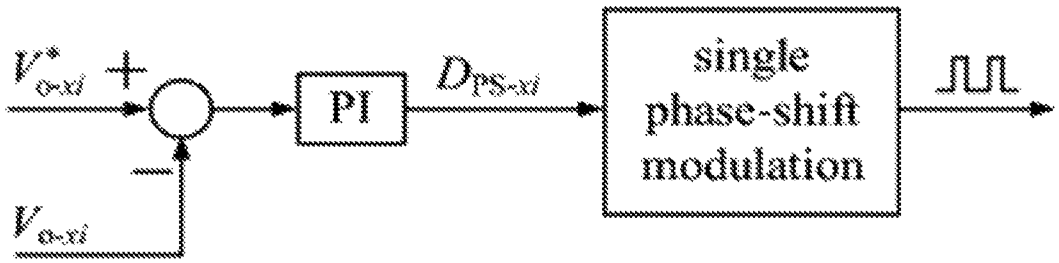
FIG. 8 is a block diagram of the DAB voltage control.

For illustration purposes only, a single phase-shift control method is adopted for the DAB. The duty cycles of the two full bridges are fixed at 0.5 and the pulses of the two full-bridges are phase shifted relative to one another. FIG. 8 illustrates the controller for the DAB output voltage, where $D_{PS\text{-}xi}$ is the phase-shift duty cycle. The controller first calculates the voltage error between the DAB output voltage $V_{0\text{-}xi}$ and its setpoint value $V^*_{o\text{-}xi}$. Then, a PI controller generates the required phase-shift duty cycle $D_{PS\text{-}xi}$ for the DAB.

Figure 9:
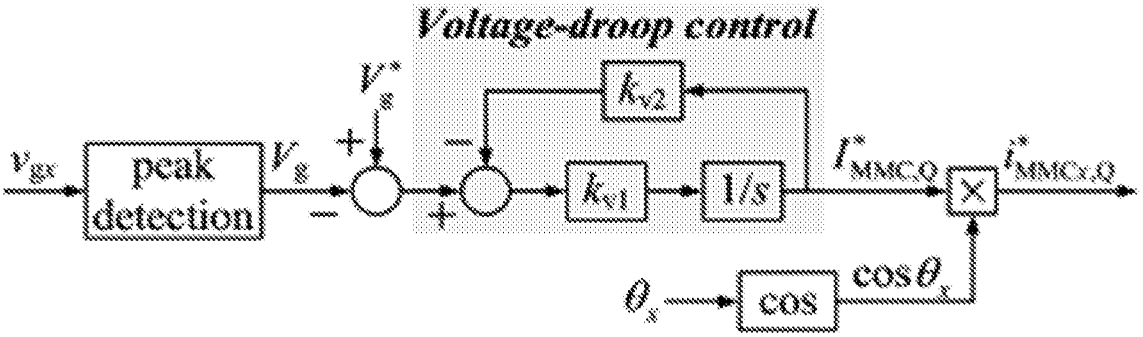
FIG. 9 is a block diagram of the input voltage control of the MMC with ES functions.

The second stage bidirectional AC/DC power converter system 204 with input ES control will now be investigated. A block diagram of an example input voltage control for the MMC with ES functions as shown in FIG. 9. The control of the input voltage is achieved by controlling reactive power generation of the MMC.

Firstly, the peak voltage value $V_g$ of the line-to-line input voltage $v_{gx}$ is detected and compared with a preset reference $V^*_g$ (e.g. $V^*_g=6.6\times\sqrt{2}=9.334$ kV for a 6.6 kV distribution line). Then, the difference between $V_g$ and $V^*_g$ is processed by a voltage-droop controller to produce the magnitude reference $I^*_{MMC,Q}$ of the MMC reactive current, i.e.

$$I^*_{MMC,Q} = -\frac{1}{k_{v2}}\left(V_g - V_g^*\right) \quad (4)$$

With reference to FIG. 9, an integration part is added in the voltage-droop controller. The voltage-droop controller limits the bandwidth of the controller to enhance system stability. The time constant of the voltage-droop controller is determined by $$\tau_v = \frac{1}{k_{v1}k_{v2}} \quad (5)$$

On the other hand, the phase information θx of the power grid is extracted from $v_{gx}$ with a PLL such as that shown in FIG. 6. By multiplying $I^*_{MMC,Q}$ and cos θx, the reference $i^*_{MMC,Q}$ of the MMC reactive current is obtained. With the input voltage control, $i^*_{MMC,Q}$ in FIG. 8 should be added into the reference current $i^*_{MMCx}$ for the MMC in FIG. 6.

Figure 10:
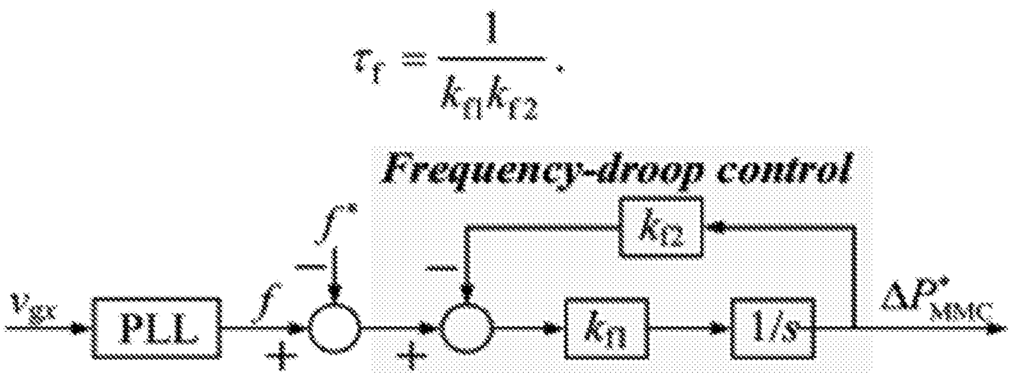
FIG. 10 is a block diagram of the input frequency control of the MMC with ES functions.

Input frequency control is achieved by adjusting the power consumption of the MMC, as illustrated in FIG. 10. The grid frequency f is firstly estimated from the input voltage $V_{gx}$ with a PLL. Then, f is compared with a preset reference f*, which should be the nominal frequency value of the power grid (e.g. 50 Hz in Singapore). A frequency-droop controller is designed to yield the power adjustment value $\Delta P^*_{MMC}$ of the MMC from the error between f and f* i.e.

$$\Delta P^*_{MMC} = \frac{1}{k_{f2}}(f - f^*) \quad (6)$$

When f>f* we have $\Delta P^*_{MMC}>0$ meaning to increase the power consumption of the MMC; when f<f* we have $\Delta P^*_{MMC}<0$ meaning to reduce the power consumption of the MMC. In particular, if the total power consumption of the MMC satisfies $P_{MMC}+\Delta P^*_{MMC}<0$ then the MMC will operate in the reverse-power-flow mode. In other words, power will flow from the load side grid to the supply or distribution side grid.

Similar to the voltage-droop controller, an integration path is also added in the frequency-droop controller to enhance the stability. The time constant of the frequency-droop controller is determined by $$\tau_f = \frac{1}{k_{f1}k_{f2}} \quad (7)$$

To facilitate the study of the behaviour of the microgrid, the average model of the MMC, which neglects all switching details, is shown formulaically below. As the MMC system in FIG. 2*a* comprises three parts, (the rectifiers, the DABs and the load) the average model can be obtained by deriving the average models of these three parts separately.

The rectifier of Phase x in the MMC system (see FIG. 5) can be described by the following state equations $$L_{MMC}\frac{di_{MMCx}}{dt} = v_{3x} - M_{x1}v_{dc-x1} - M_{x2}v_{dc-x2} \quad (8)$$

$$C_{dc-x1}\frac{dv_{dc-x1}}{dt} = M_{x1}i_{MMCx} - i_{dco-x1} \quad (9)$$

$$C_{dc-x2}\frac{dv_{dc-x2}}{dt} = M_{x2}i_{MMCx} - i_{dco-x2} \quad (10)$$

The average model for the DABs can be determined with reference to the output current $i_{DABo-xi}$ of a DAB module. Considering the reversible-power-flow requirement of the MMC system, the bidirectional equation of $i_{DABo-xi}$ can be expressed as $$i_{DABo-xi} = \frac{N_1 v_{dc-xi} D_{PS-xi}(1 - |D_{PS-xi}|)}{2N_2 f_s L_{DABp}} \quad (11)$$

A positive $D_{PS-xi}$ corresponds to power flowing from the primary side to the secondary side, while a negative $D_{PS-xi}$ indicates a reverse power flow.

The state equation of the output capacitor $C_{0-xi}$ is given by $$C_{o-xi}\frac{dv_{0-xi}}{dt} = i_{DABo-xi} - i_{o-xi} \quad (12)$$

According to the principle of conservation of energy, the DAB module is also governed by $$v_{dc-xi}i_{dco-xi} = v_{o-xi}i_{DABo-xi} \quad (13)$$

Figure 11:
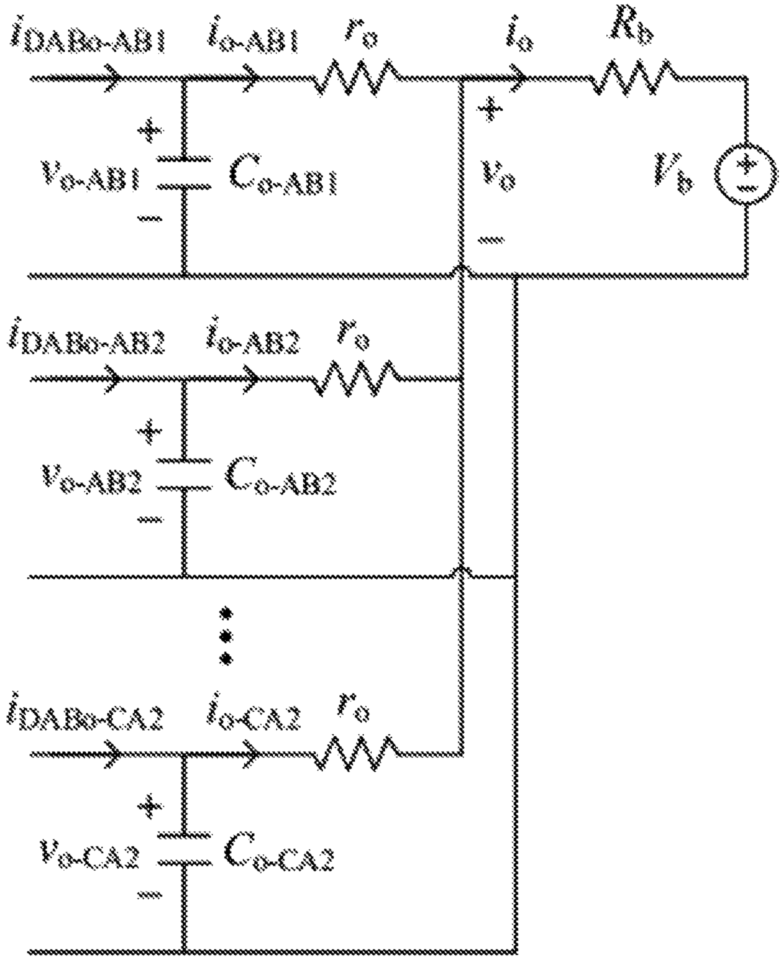
FIG. 11 is a circuit diagram of a load part in a bidirectional AC-DC MMC system.

Lastly, the average model of the load is calculated with reference to FIG. 11. A small wire resistance $r_0$ is considered so that the six voltages $v_{0-AB1}$, $v_{0-AB2}$ . . . , $V_{0-CA2}$ can be connected in parallel. The battery load is modelled as an adjustable voltage source $V_b$ in series with a resistor $R_b$. The value $V_b$ of determined the charging or discharging power of the battery.

According to Kirchoff's current and voltage laws one has $$v_o = v_{o-xi} - r_o i_{o-xi} \quad (14)$$

$$v_o = V_b + R_b i_o \quad (15)$$

$$i_0 = \sum\nolimits_{x,i} i_{0-xi} \quad (16)$$

Thus the set of equations from (8) to (16) form the average model of a MMC system which can be combined with the control laws illustrated in FIGS. 6, 8, 9 and 10 to describe the closed-loop performance of the bidirectional AC-DC power converter system.

Figure 3A:
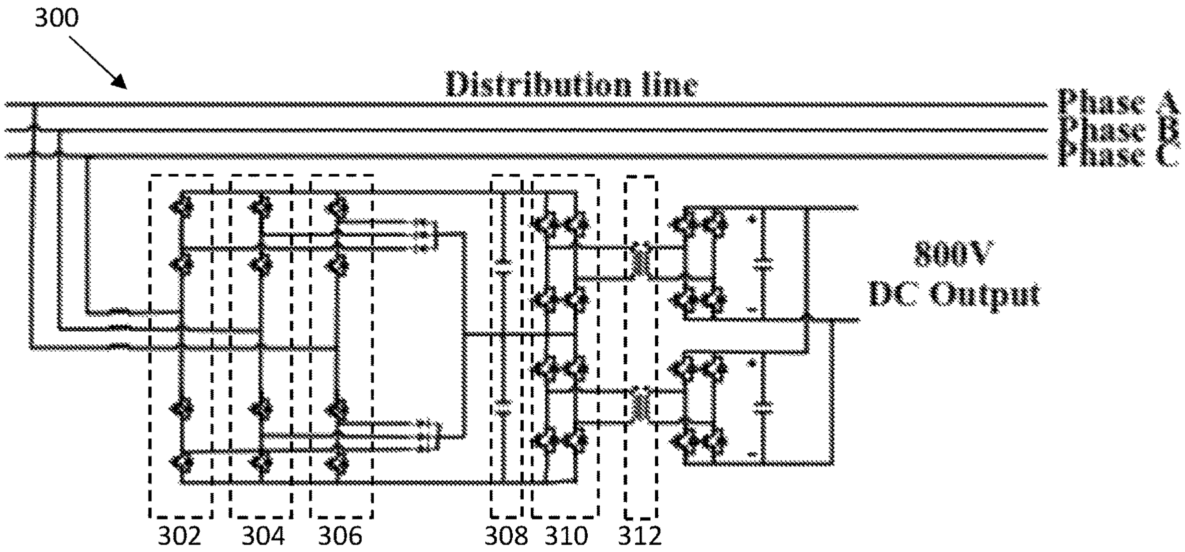
FIG. 3*a* illustrates a multilevel converter, particularly a three-level neutral-point-clamped multilevel converter, as the front-end power converter.

FIG. 3*a* shows an alternative power conversion system topology, being that of a MLC 300. MLC 300 is a bidirectional AC-DC power conversion system with three power stages 302, 304 and 306. The example shown in FIG. 3*a* employs a three-level neutral-clamped power converter as the first AC-DC power converter in the proposed bidirectional AC-DC power conversion system 300. The DC voltages across two DC capacitors 308 are stepped down into medium-frequency AC voltages through intermediate DC-AC power inverter 310 (which may use the same DAB topology as the MMC 200) with transformer isolation (transformer 312). The AC voltages from the isolation transformer are then converted into a DC voltage in the third AC-DC power conversion stage to power the DC power grid.

Figure 3B:
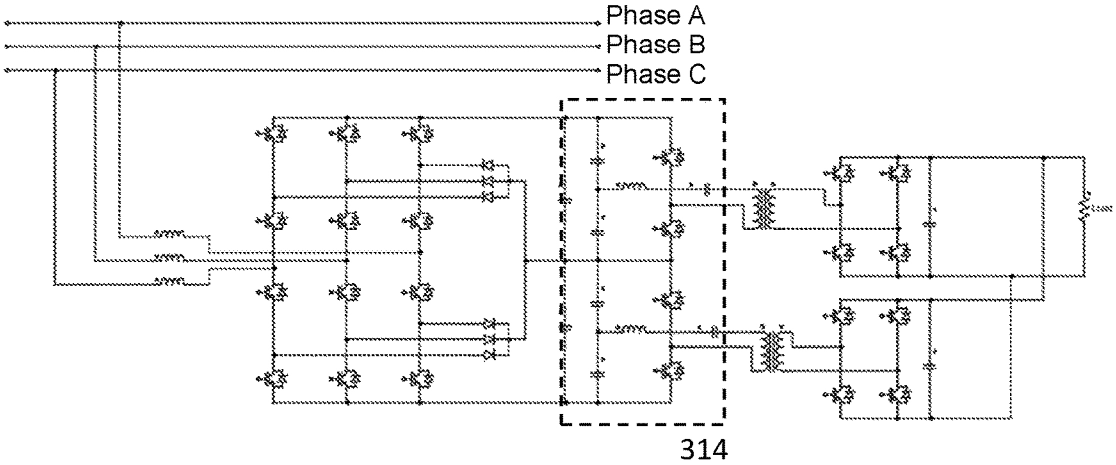
FIG. 3*b* is an alternative implementation based on the use of a Neutral-Point-Clamped 3-level power converter in the first power stage.
Figure 3C:
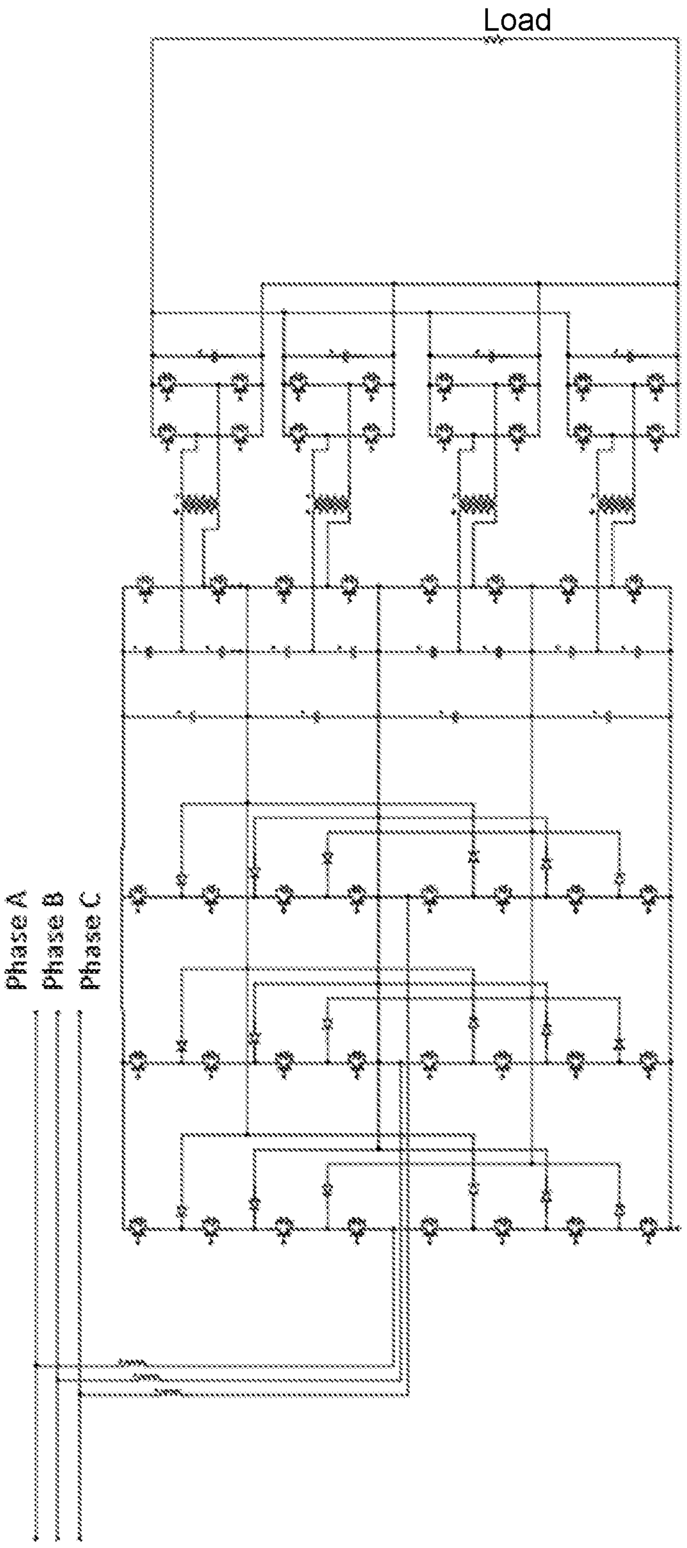
FIG. 3*c* is an alternative implementation based on the use of a Neutral-Point-Clamped 5-level power converter in the first power stage.

FIG. 3*b* shows an alternative Neutral-Point-Clamped (NPC) 3-level power converter fed by three-phase distribution lines. The voltage across each of the two output capacitors of the NPC 3-level power converter is connected to the second DC-AC half-bridge inverter with isolation transformer with LC (a combination of one or more inductors and one or more capacitors) filter 314 to provide a medium-frequency voltage with reduced magnitude. In this example, the two medium voltages feed two separate active rectifiers, the DC outputs of them are linked together to form a common DC voltage source for the DC power grid. FIG. 3*c* shows another example based on a NPC 5-level power converter.

Referring back to FIG. 1*b*, using the above circuit topologies, and others, the supply-side control loop 116 can be configured (e.g. using controller 126) to draw power from the one or more DC loads 122 into the grid 102 to stabilise the supply-side AC voltage and/or supply-side frequency, depending on the measurements taken by the supply-side AC voltage control loop 120 and/or supply-side frequency control loop 118. In particular, the supply-side control loop 116 can control the supply-side AC voltage by controlling the reactive power generation of the bidirectional AC-DC power conversion system 110. Similarly, the supply-side controller 116 can control the supply-side frequency by controlling power consumption through the bidirectional AC-DC power conversion system 110. Each of these control measures can therefore be used to stabilise the frequency of the supply-side grid 102 or the supply-side AC voltage.

The control methodology can be applied iteratively to control bidirectional power. For example, transmission of power to the loads may be reduced if the supply-side frequency is less than a nominal mains frequency as determined by first measurement. If a second, later measurement shows that the supply-side frequency remains below the nominal mains frequency, power may be transmitted from the one or more loads across the bidirectional power converter 110 to the supply-side network to stabilise the supply-side AC frequency.

The same controller 126 can be used to reduce power imbalance of the first stage 202, second stage 204 and third stage 206 of the MMC 200. Power switches in one or more of the three power stages of the system may be soft-switched to maintain control.

Such systems can be used with a single grid or microgrid on the load side, or multiple grids or microgrids. For example, the load side grid may comprise one or more microgrids each corresponding to a respective parking infrastructure building, where each load of the one or more loads being a load in a respective parking infrastructure building. Each load may be an EV charging point or group of EV charging points in a respective parking infrastructure building. The one or more loads may comprise electric vehicle batteries of a respective one or more electric vehicles connected to the load side grid.

Figure 12:
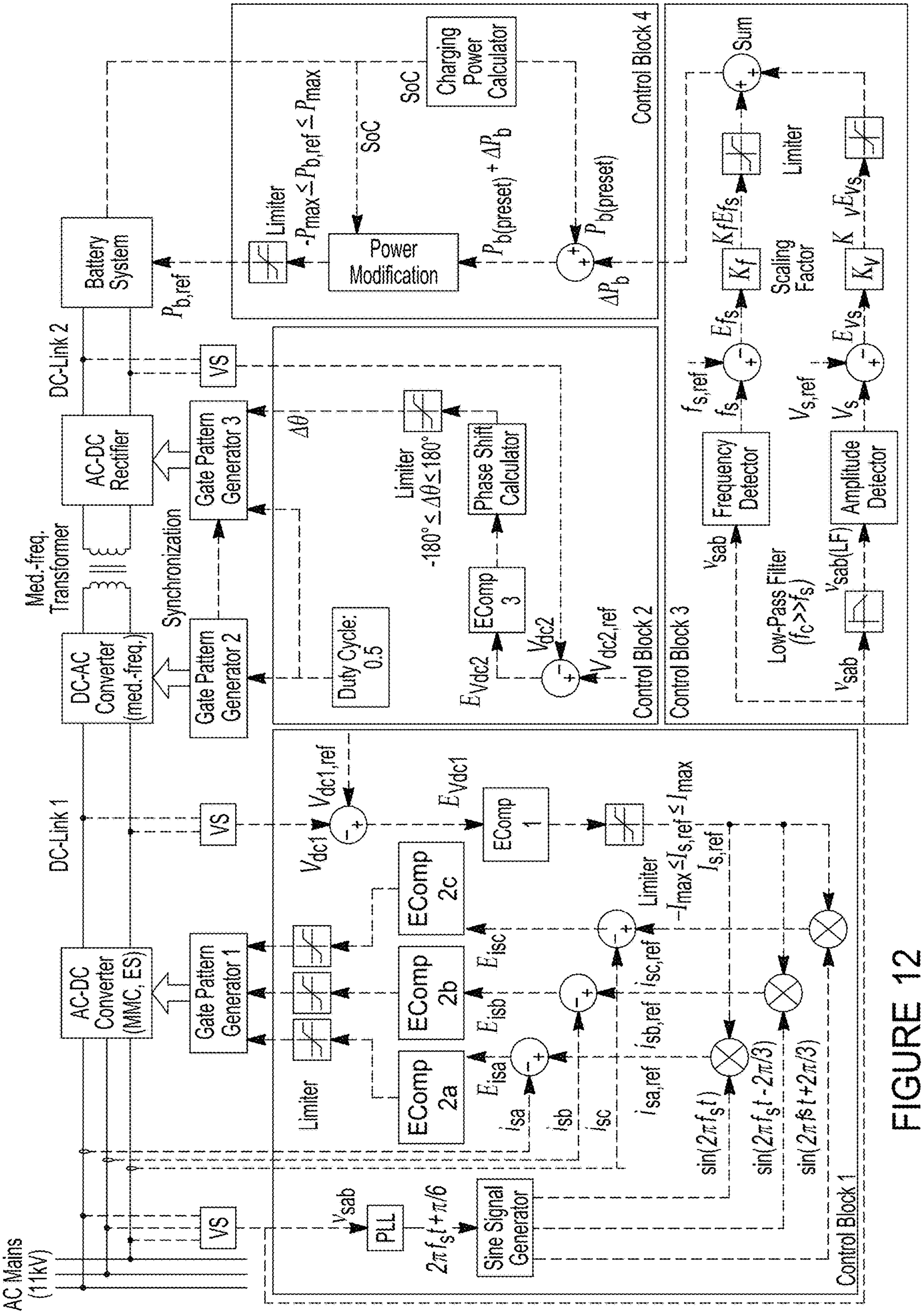
FIG. 12 is a control diagram for a bidirectional AC-DC power conversion system with electric spring functions for balanced 3-phase AC power distribution lines.

FIG. 12 illustrates an embodiment of a control diagram for the proposed bidirectional AC-DC power conversion system with electric spring functions for a balanced 3-phase AC power distribution lines. There are four main control blocks in the proposed control scheme. Control Block 1 performs voltage regulation of DC-Link 1 based on a nested control structure. Control Block 2 performs voltage regulation of DC-Link 2 based on a phase-shift control method. Control Block 3 performs the adaptive power control function based on the line-frequency control and the line-voltage level control. Control Block 4 performs the charging/discharging control of the one or more loads on the load side grid (similarly referred to as the DC grid/DC power grid). For the discussion of Control Blocks 1 to 4 and A, the one or more loads may be a Battery System for illustration purposes. The batteries may be used or aftermarket batteries, or may be EVs or EV parking infrastructure.

In Control Block 1, on one hand, the voltage of DC-Link 1 $V_{dc1}$ is measured with a voltage sensor (VS) and compared with the reference voltage $V_{dc1,ref}$ for the DC-Link 1. The difference of these two voltages Evaci is processed by Error Compensator 1 (or EComp 1) and a limiter to generate the reference current amplitude $I_{s,ref}$, which satisfies $-I_{max}$ $<=I_{s,ref}<=I_{max}$. On the other hand, the three line voltages $V_{sab}$, $V_{sbc}$, and $V_{sca}$ are measured with voltage sensors. In particular, the phase of $V_{sab}$, which leads the phase of the Phase-A voltage $V_{sa}$ by 6/π, is extracted with a phase-locked loop (PLL), i.e., $2\pi f_s t+6/\pi$. With the phase of $V_{sab}$, the Sine Signal Generator generates three sine functions, i.e., sin$(2\pi f_s t)$, $\sin(2\pi f_s t-2\pi/3)$, and $\sin(2\pi f_s t+2\pi/3)$. Then, these three functions are multiplied by $I_{s,ref}$, respectively, to produce the reference currents $i_{sa,ref}$, $i_{sb,ref}$, and $i_{sc,ref}$ for the three phases. The line currents $i_{sa}$, $i_{sb}$, and $i_{sc}$ are measured with current sensors and compared with $i_{sa,ref}$, $i_{sb,ref}$, and $i_{sc,ref}$, respectively. The differences $E_{isa}$, $E_{isb}$, and $E_{isc}$ are processed by EComp 2*a*, EComp 2*b*, and EComp 2*c*, respectively. The outputs of EComp 2*a*, EComp 2*b*, and EComp 2*c* each are passed through a limiter and fed into Gate Pattern Generator 1 to drive the ES. Besides the basic control scheme given in FIG. 1*a*, additional functionalities, such as reactive power generation, unbalanced current compensation, etc., can be achieved with the ES by modifying the reference currents $i_{sa,ref}$, $i_{sb,ref}$, and $i_{sc,ref}$.

In Control Block 2, the voltage of DC-Link 2 $V_{dc2}$ is measured with a voltage sensor and compared with the reference voltage $V_{dc2,ref}$ for the DC-Link 2. The difference of these two voltages $E_{Vdc2}$ is processed by EComp 3. The output of EComp 3 is fed into the Phase Shift Calculator and passed through a limiter to generate a phase shift value Δθ, which satisfies −180°≤Δθ≤180°. The duty cycle of 0.5 is fed into both Gate Pattern Generator 2 and Gate Pattern Generator 3, while the phase shift value 40 is only fed into Gate Pattern Generator 3. Gate Pattern Generator 2 also generates a synchronization signal for Gate Pattern Generator 2 such that a steady and strict phase shift of se is achieved between Gate Pattern Generator 2 and Gate Pattern Generator 3.

In Control Block 3, on one hand, a circuit or method to detect the frequency $f_S$ of the line voltage $V_{sab}$ is adopted. The detected frequency $f_s$ is compared with the reference frequency $f_{s,ref}$ for the line voltage. The difference of these two frequencies $E_{fs}$ is scaled by a factor $K_f$ and then passed through a limiter and input into the adder Sum. On the other hand, the line voltage $V_{sab}$ is passed through a Low-Pass Filter to produce $V_{sab(LF)}$. The cutoff frequency $f_c$ of the Low-Pass Filter is much higher than the line frequency $f_s$, e.g., $f_c=10f_s$. A circuit or method to detect the amplitude of $V_{sab(LF)}$ is adopted. The detected voltage amplitude $V_s$ is compared with the reference voltage amplitude $V_{s,ref}$. The difference of these two voltages $E_{Vs}$ is scaled by a factor $K_V$ and then passed through a limiter and input into the adder Sum.

In Control Block 4, the state of charge (SoC) of the Battery System is measured and fed into the Charging Power Calculator. The Charging Power Calculator calculates the charging power $P_{b(preset)}$ for the Battery System according to the current SoC of the Battery System and the predetermined charging profile. The output $\Delta P_b$ of Control Block 3 is added to $P_{b(preset)}$ to produce the new charging power $P_{b(preset)}+\Delta P_b$, which is adaptive to the line voltages. Then, $P_{b(preset)}+\Delta P_b$ is modified in the Power Modification block according to the current SoC of the Battery System. For example, when the SoC of the Battery System is empty, $P_{b(preset)}+\Delta P_b$ will be restricted in the non-negative range; when the SoC of the Battery System is full, $P_{b(preset)}+\Delta P_b$ will be restricted in the non-positive range. The output of the Power Modification block is passed through a limiter to generate the finalized reference charging/discharging power $P_{b,ref}$, which satisfies $-P_{max}\leq P_{b,ref}\leq P_{max}$.

The control scheme given in FIG. 12 supports bidirectional power flow and seamless transition between the two modes: i) when power flows from the AC mains to the Battery System, the reference current amplitude $I_{s,ref}$ in Control Block 1, the phase shift value $\Delta\theta$ in Control Block 2, and the finalized reference charging/discharging power $P_{b,ref}$ in Control Block 4 are all positive; ii) when power flows from the Battery System to the AC mains, the reference current amplitude $I_{s,ref}$ in Control Block 1, the phase shift value $\Delta\theta$ in Control Block 2, and the finalized reference charging/discharging power $P_{b,ref}$ in Control Block 4 are all negative.

Figure 13A:
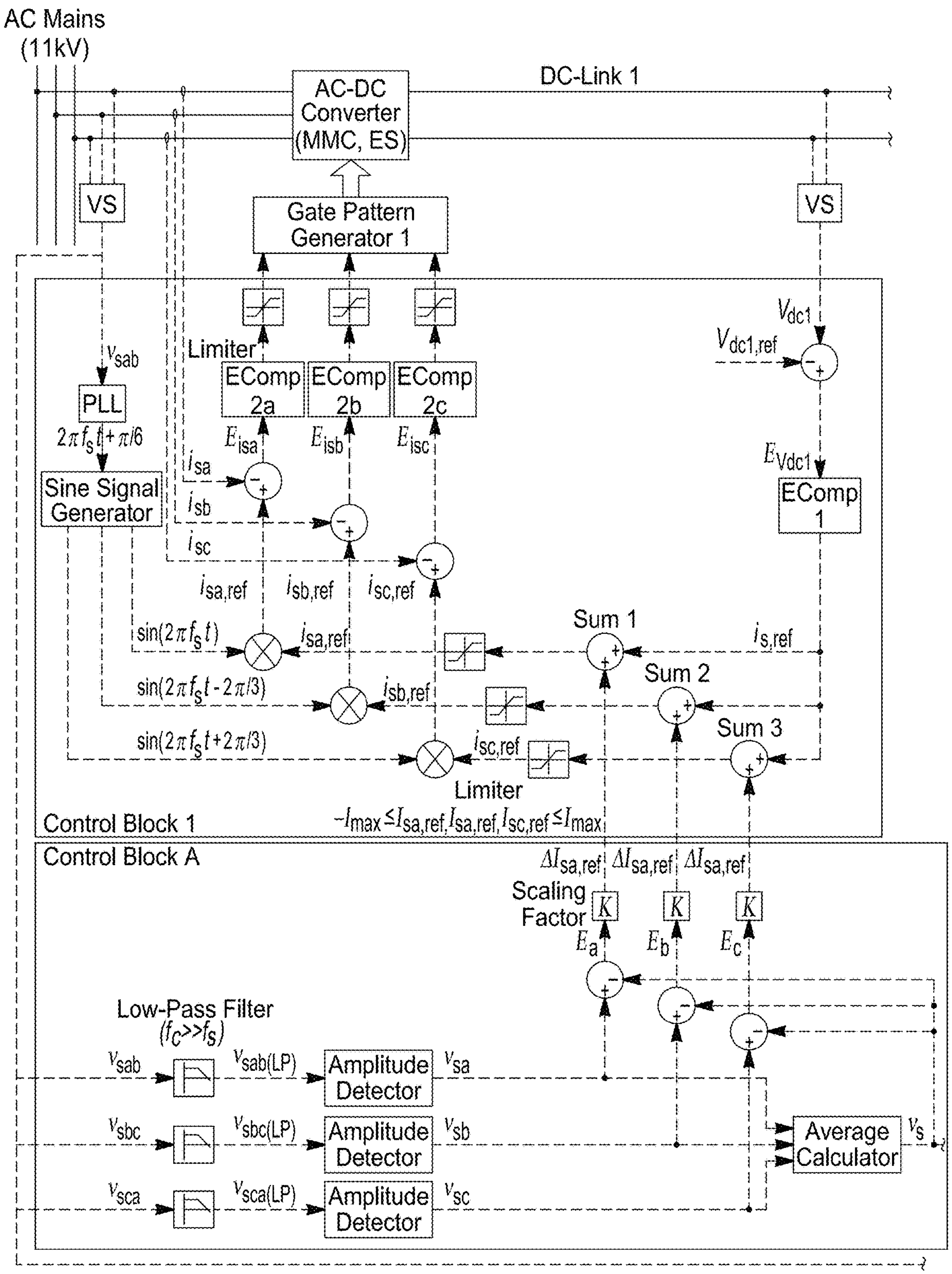
FIG. 13 is a control diagram for a bidirectional AC-DC power conversion system with electric spring functions for unbalanced 3-phase AC power distribution lines.
Figure 13B:
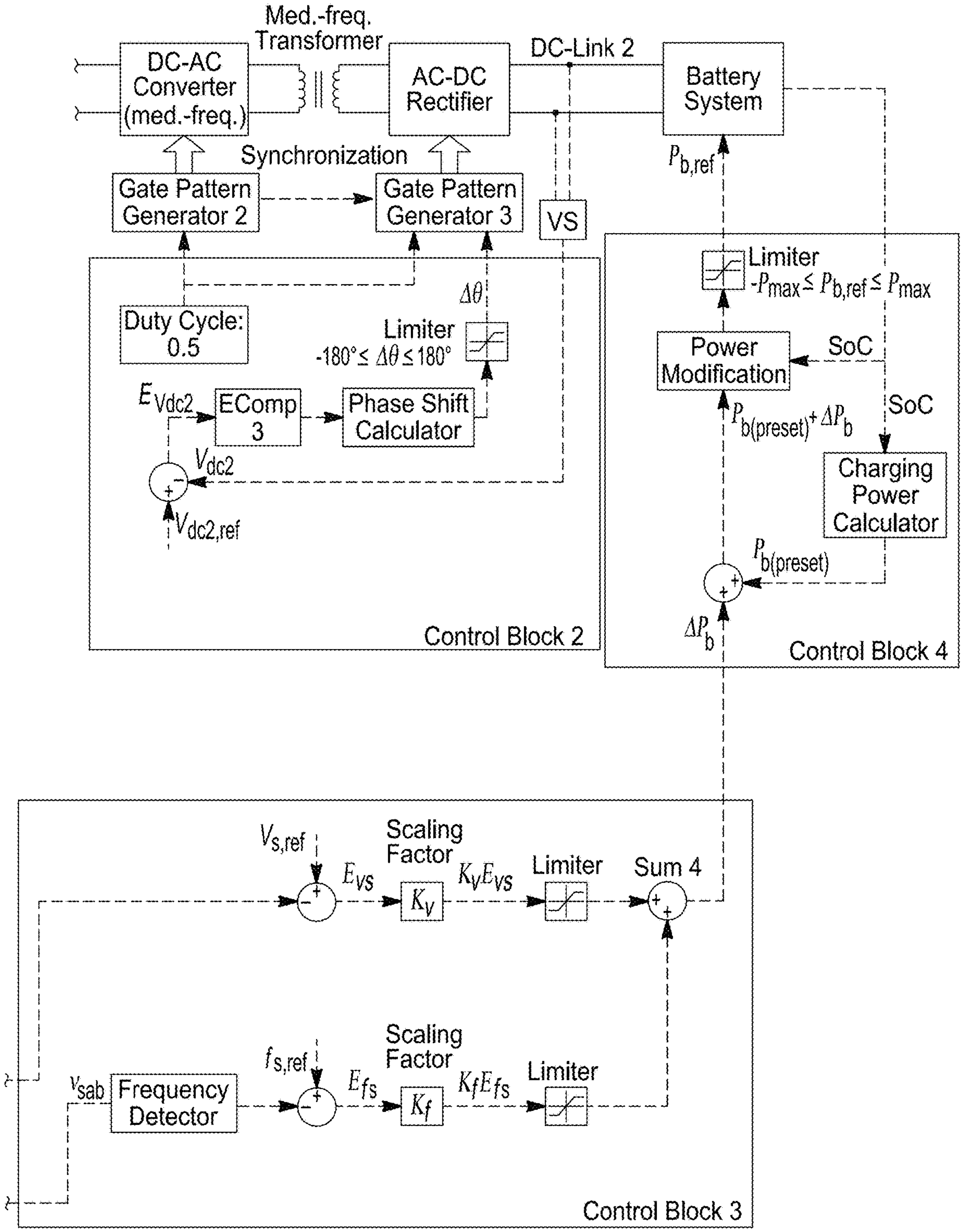

An alternative control scheme for the proposed bidirectional AC-DC power conversion system with electric spring functions for an unbalanced 3-phase AC power distribution lines is shown in FIG. 13, in which there are five main control blocks. Control Block A performs the line voltage balancing function. Control Block 1 performs voltage regulation of DC-Link 1 based on a nested control structure. Control Block 2 performs voltage regulation of DC-Link 2 based on a phase-shift control method. Control Block 3 performs the adaptive power control function based on the line-frequency control and the line-voltage level control. Control Block 4 performs the charging/discharging control of the Battery System.

In Control Block A, the line voltages $V_{sab}$, $V_{sbc}$, and $V_{sca}$ are measured with voltage sensors (VSs). $V_{sab}$, $V_{sbc}$, and $V_{sca}$ each are passed through a Low-Pass Filter to produce $V_{sab(LF)}$, $V_{sbc(LF)}$, and $V_{sca(LF)}$, respectively. The cutoff frequency $f_c$ of the Low-Pass Filters is much higher than the line frequency $f_s$, e.g., $f_c=\mathbf{10}f_s$. A circuit or method to detect the amplitudes of $V_{sab(LF)}$, $V_{sbc(LF)}$, and $V_{sca(LF)}$ is adopted and produces $V_{sa}$, $V_{sb}$, and $V_{sc}$. The average value of the amplitudes $V_{sa}$, $V_{sb}$, and $V_{sc}$ is calculated with the Average Calculator, i.e., $V_s=(V_{sa}+V_{sb}+V_{sc})/3$. $V_{sa}$, $V_{sb}$, and $V_{sc}$ are compared with $V_s$, and the differences $E_a$, $E_b$, and $E_c$ are scaled by a factor K to produce $\Delta I_{sa,ref}$, $\Delta I_{sb,ref}$, and $\Delta I_{sc,ref}$, respectively. The function of $\Delta I_{sa,ref}$, $\Delta I_{sb,ref}$, and $\Delta I_{sc,ref}$ is to balance the line voltages $V_{sab}$, $V_{sbc}$, and $V_{sca}$. For example, if $V_{sa}>V_s$, $\Delta I_{sa,\ ref}=K(V_{sa}-V_s)$ will be negative and the Phase-A line current $i_{sa}$ will be increased to reduce $V_{sa}$. This is conversely true for the case of $V_{sa}<V_s$, where $\Delta I_{sa,ref}$ will be positive and the Phase-A line current isa will be reduced to increase $V_{sa}$. The same operation is applied to $V_{sb}$, and $V_{SC}$. $\Delta I_{sa,ref}$, $\Delta I_{sb,ref}$, and $\Delta I_{sc,ref}$ are input into the adders Sum 1, Sum 2, and Sum 3 in Control Block 1, respectively.

In Control Block 1, on one hand, the voltage of DC-Link 1 $V_{dc1}$ is measured with a voltage sensor and compared with the reference voltage $V_{dc1,ref}$ for the DC-Link 1. The difference of these two voltages $E_{Vdc1}$ is processed by Error Compensator 1 (EComp 1) to generate the reference current amplitude $I_{s,ref}$, which is then input into the adders Sum 1, Sum 2, and Sum 3. The outputs of Sum 1, Sum 2, and Sum 3 each are passed through a limiter to produce $I_{sa,ref}$, $I_{sb,ref}$, and $I_{sc,ref}$, which satisfy $-I_{max}\leq I_{sa,ref}$, $I_{sb,ref}$, $I_{sc,ref}\leq I_{max}$. On the other hand, the phase of $V_{sab}$, which leads the phase of the Phase-A voltage $V_{sa}$ by $6/\pi$, is extracted with a phase-locked loop (PLL), i.e., $2\pi f_s t+6/\pi$. With the phase of $V_{sab}$, the Sine Signal Generator generates three sine functions, i.e., $\sin(2\pi f_s t)$, $\sin(2\pi f_s t-2\pi/3)$, and $\sin(2\pi f_s t+2\pi/3)$. Then, these three functions are multiplied by $I_{sa,ref}$, $I_{sb,ref}$, and $I_{sc,ref}$, respectively, to produce the reference currents $i_{sa,ref}$, $i_{sb,ref}$, and $i_{sc,ref}$ for the three phases. The line currents $i_{sa}$, $i_{sb}$, and $i_{sc}$ are measured with current sensors and compared with $i_{sa,ref}$, $i_{sb,ref}$, and $i_{sc,ref}$, respectively. The differences $E_{isa}$, $E_{isb}$, and $E_{isc}$ are processed by EComp 2*a*, EComp 2*b*, and EComp 2*c*, respectively. The outputs of EComp 2*a*, EComp 2*b*, and EComp 2*c*, each is passed through a limiter and fed into Gate Pattern Generator 1 to drive the ES.

In Control Block 2, the voltage of DC-Link 2 $V_{dc2}$ is measured with a voltage sensor and compared with the reference voltage $V_{dc2,ref}$ for the DC-Link 2. The difference of these two voltages $E_{Vdc2}$ is processed by EComp 3. The output of EComp 3 is fed into the Phase Shift Calculator and passed through a limiter to generate a phase shift value 40, which satisfies $-180°\leq\Delta\theta\leq 180°$. The duty cycle of 0.5 is fed into both Gate Pattern Generator 2 and Gate Pattern Generator 3, while the phase shift value $\Delta\theta$ is only fed into Gate Pattern Generator 3. Gate Pattern Generator 2 also generates a synchronization signal for Gate Pattern Generator 2 such that a steady and strict phase shift of $\Delta\theta$ is achieved between Gate Pattern Generator 2 and Gate Pattern Generator 3.

In Control Block 3, on one hand, a circuit or method to detect the frequency $f_S$ of the line voltage $V_{sab}$ is adopted. The detected frequency $f_s$ is compared with the reference frequency $f_{s,ref}$ for the line voltage. The difference of these two frequencies $E_{fs}$ is scaled by a factor $K_f$ and then passed through a limiter and input into the adder Sum 4. On the other hand, the average line voltage amplitude $V_s$ is compared with the reference voltage amplitude $V_{s,ref}$. The difference of these two voltages $E_{Vs}$ is scaled by a factor $K_V$ and then passed through a limiter and input into the adder Sum 4.

In Control Block 4, the state of charge (SoC) of the Battery System is measured and fed into the Charging Power Calculator. The Charging Power Calculator calculates the charging power $P_{b(preset)}$ for the Battery System according to the current SoC of the Battery System and the predetermined charging profile. The output $\Delta P_b$ of Control Block 3 is added to $P_{b(preset)}$ to produce the new charging power $P_{b(preset)}+\Delta P_b$, which is adaptive to the line voltages. Then, $P_{b(preset)}+\Delta P_b$ is modified in the Power Modification block according to the current SoC of the Battery System. For example, when the SoC of the Battery System is empty, $P_{b(preset)}+\Delta P_b$ will be restricted in the non-negative range; when the SoC of the Battery System is full, $P_{b(preset)}+\Delta P_b$ will be restricted in the non-positive range. The output of the Power Modification block is passed through a limiter to generate the finalized reference charging/discharging power $P_{b,ref}$, which satisfies $-P_{max}\leq P_{b,ref}\leq P_{max}$.

The control scheme of FIG. 13 supports bidirectional power flow and seamless transition between the two modes: i) When power flows from the AC mains to the Battery System, the reference current amplitude $I_{s,ref}$ in Control Block 1, the phase shift value $\Delta\theta$ in Control Block 2, and the finalized reference charging/discharging power $P_{b,ref}$ in Control Block 4 are all positive; ii) When power flows from the Battery System to the AC mains, the reference current amplitude $I_{s,ref}$ in Control Block 1, the phase shift value $\Delta\theta$ in Control Block 2, and the finalized reference charging/discharging power $P_{b,ref}$ in Control Block 4 are all negative.

Thus, in various embodiments there is a control system for an AC-DC power converter system that includes: a first control block configured to perform voltage regulation of a first dc link (e.g. DC-Link 1) based on a nested control structure; a second control block configured to perform voltage regulation of a second dc link (e.g. DC-Link 2) based on a phase-shift control method; a third control block configured to perform adaptive power control function based on line-frequency control and line-voltage level control; and a fourth control block configured to perform charging/discharging control of a load (e.g. Battery System).

For an unbalanced three-phase power system, the control system comprises a further control block configured to perform line voltage balancing function. To ensure power balance at the demand and supply, when a reduction in frequency is detected in the third control block, the power demand is reduced accordingly.

It is understood that a control method comprises features which correspond to the control system. The control mechanism reduces power imbalance among the power modules forming the power stages.

Thus, the AC-DC power conversion system can include:

a. a first bidirectional AC-DC power conversion stage with control functions of input power factor, bidirectional power flow, input AC voltage regulation and input frequency regulation functions whilst such AC-DC power circuit is normally fed by a three-phase power distribution power system of ac mains frequency;

b. a second bidirectional DC-AC power conversion stage with voltage-step-down functions through the power converter circuit topology and a voltage-step-down isolation transformer, whereas the output of its secondary voltage is a medium-frequency AC voltage with magnitude much lower than that of the AC power distribution system;

c. an arrangement of the secondary winding or windings of one or more medium-frequency isolation transformers, forming a single or multi-phase medium-frequency AC-voltage source, for feeding the third medium-frequency AC-DC power conversion stage which has a regulated output DC voltage feeding a load with energy storage.

d. controllers for the first, second and the third power stages for achieving bidirectional power flow between an AC power distribution network and a DC power grid feeding the load with energy storage, whereas the control includes the regulations of (i) the input AC frequency (ii) the input AC voltage and (iii) the output DC voltage. The controllers can be any as set out above or derivable therefrom.

The system can thus implement a control method for an AC-DC power conversion system, by:

a. controlling a first bidirectional AC-DC power conversion stage with control functions of input power factor, bidirectional power flow, input AC voltage regulation and input frequency regulation functions, wherein such AC-DC power circuit is normally fed by a three-phase power distribution power system of ac mains frequency;

b. controlling a second bidirectional DC-AC power conversion stage with voltage-step-down functions through the power converter circuit topology and a voltage-step-down isolation transformer, wherein the output of its secondary voltage is a medium-frequency AC voltage with magnitude much lower than that of the AC power distribution system;

c. providing an arrangement of the secondary winding or windings of one or more medium-frequency isolation transformers, forming a single or multi-phase medium-frequency AC-voltage source, for feeding the third medium-frequency AC-DC power conversion stage which has a regulated output DC voltage feeding a load with energy storage.

To achieve this control, sensing of the input AC voltage and frequency is necessary as discussed with reference to FIG. 1*b*, and the output DC voltage for regulation purposes. Moreover, each of the first, second and the third power stages uses a controller for achieving bidirectional power flow between an AC power distribution network and a DC power grid feeding the load with energy storage, whereas the control method includes regulating one or more of (i) the input AC frequency (ii) the input AC voltage and (iii) the output DC voltage, and (iv) bidirectional power flow between the AC power distribution network and the energy storage on the load side. As such the controller has a control mechanism to reduce power imbalance among power modules in the system.

Figure 4:
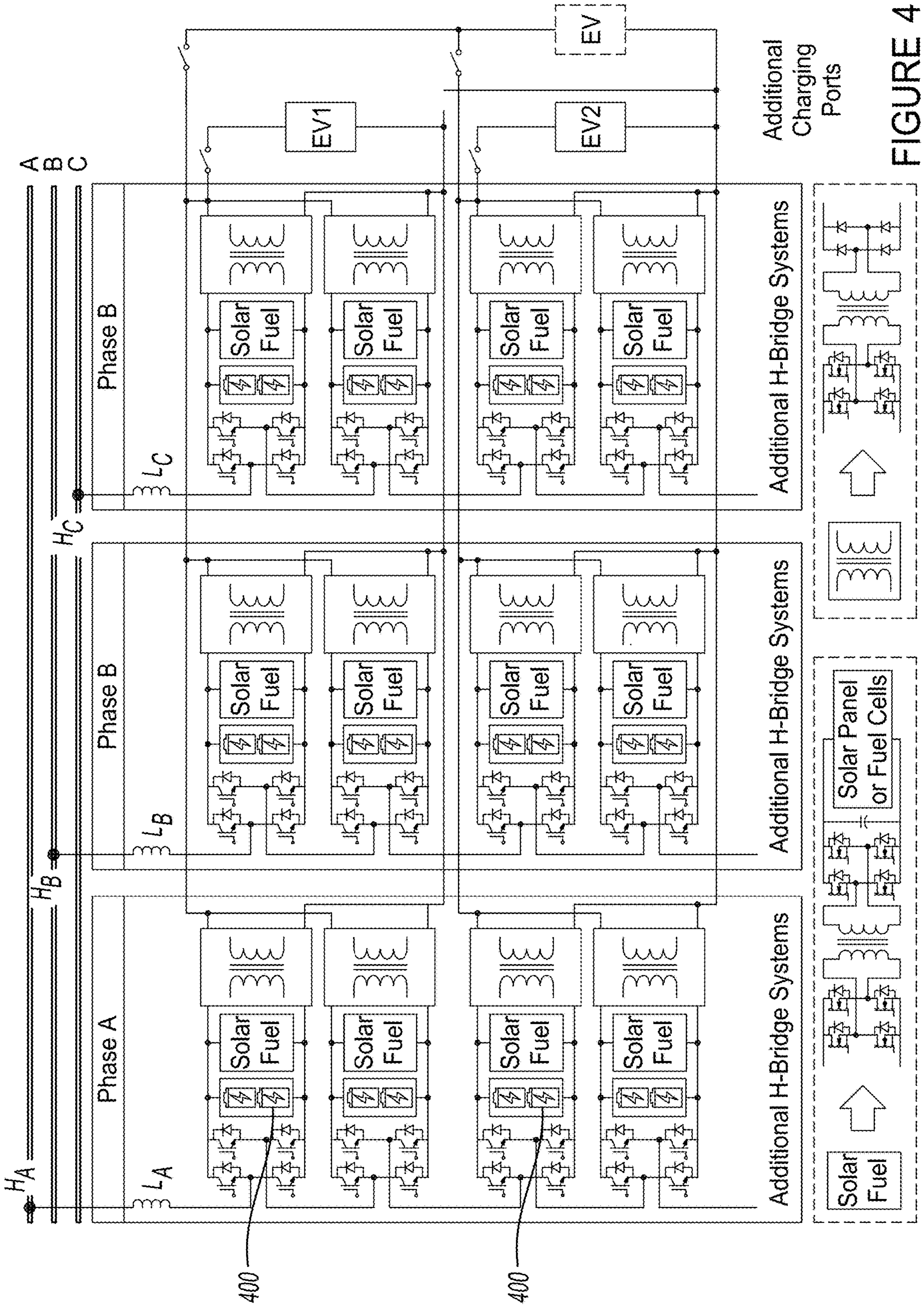
FIG. 4 illustrates the AC-DC power conversion system with batteries used in DC voltage links.

The result is a system designed to incorporate energy storage devices in DC voltage links as shown in FIG. 4 in power distribution balancing and stability applications. In particular, FIG. 4 shows batteries or fuel cells 400 used in the DC voltage links. Second-life batteries, such as those recovered from used electric vehicles, can be considered for such applications for environment protection.

In one embodiment, an AC-DC power converter system comprises: a first power conversion stage comprising a bidirectional AC-DC power converter, wherein the bidirectional AC-DC power converter comprises a plurality of multilevel power converters or modular multilevel converters (MMCs); a second power conversion stage comprising one or more bidirectional DC-AC converters; one or more medium-frequency isolation transformers comprising primary windings and secondary windings; and a third power conversion stage comprising one or more bidirectional AC-DC rectifiers configured to provide a DC output to a DC power grid.

The primary windings of the medium-frequency isolation transformers are coupled to the second power conversion stage, and the secondary windings of the medium-frequency isolation transformers are coupled to the third power conversion stage.

The input of the AC-DC power converter system is an AC voltage of the AC power system. The DC output of the AC-DC power converter system can be regulated DC voltage outputs, which (i) stay as individual DC voltage sources, (ii) be linked together to form one common DC voltage source for the DC power grid, (iii) or be grouped together to form several common DC voltage sources for the DC power grid.

In each case, a controller, such as controller 126, may be used to stabilise the grid as a whole. However, it may be advantageous where multiple charging infrastructures or other loads are connected via the DC grid to a single ES (e.g. bidirectional power converter 110 of FIG. 1*b*), that power to each infrastructure or load is separately controllable (in some cases each load may be on its own microgrid connected by an ES to the power distribution network per FIG. 1*c*, or each load may be connected via a microgrid to the DC side network which may itself be referred to as a microgrid). To achieve this, each load requires a controller for controlling bidirectional power transmission independently to/from each load or each microgrid comprising such a load. Using such a scheme, where multiple loads are, for example, drawing power from a single DC grid and the supply side frequency increases above a nominal frequency (which may include ±a particular percentage of the frequency) controllers for some, but not all, of the loads can reduce power consumption from, or can supply power to, the DC grid.

To implement such a scheme, a load side control distributor 128 may separately control controllers for managing bidirectional power transmission at each respective load, or each microgrid comprising such a load, in accordance with various control conditions. In this sense, a "control condition" refers to a condition that can be used to determine whether to adjust power transmission/consumption at each load or the amount of any such adjustment.

A control condition can be any relevant condition such as averaging a change in power consumption across all buildings (loads), reducing or increasing power consumption at each building in proportion to the amount of electric vehicle storage available at each respective building, adjusting power consumption at only a subset of buildings based on the size of the change in power consumption desired across the system, and other suitable conditions.

To examine the performance of the system, the steady-state performance, transient performance, and bidirectional-power-flow operation of MMC systems are assessed with power circuit simulation based on PSIM software packages. High-frequency switching operations of a full converter system are included in the simulation.

Firstly, steady-state performance of input power factor and output DC voltage control of the ES-based MMC is assessed. The power flow from the AC grid to the DC grid is first considered. In this converter test, the MMC draws a rated power of 150 kW from a stiff 6.6 kV grid to the 800 V DC power grid with a resistive load. The input current and power factor, the intermediate DC voltage link, the voltage and current of the DAB with the medium-frequency isolation transformer, and the output DC grid voltage are examined. The simulation waveforms of the power converter system are shown in FIGS. 14 to 16.

Figure 14:
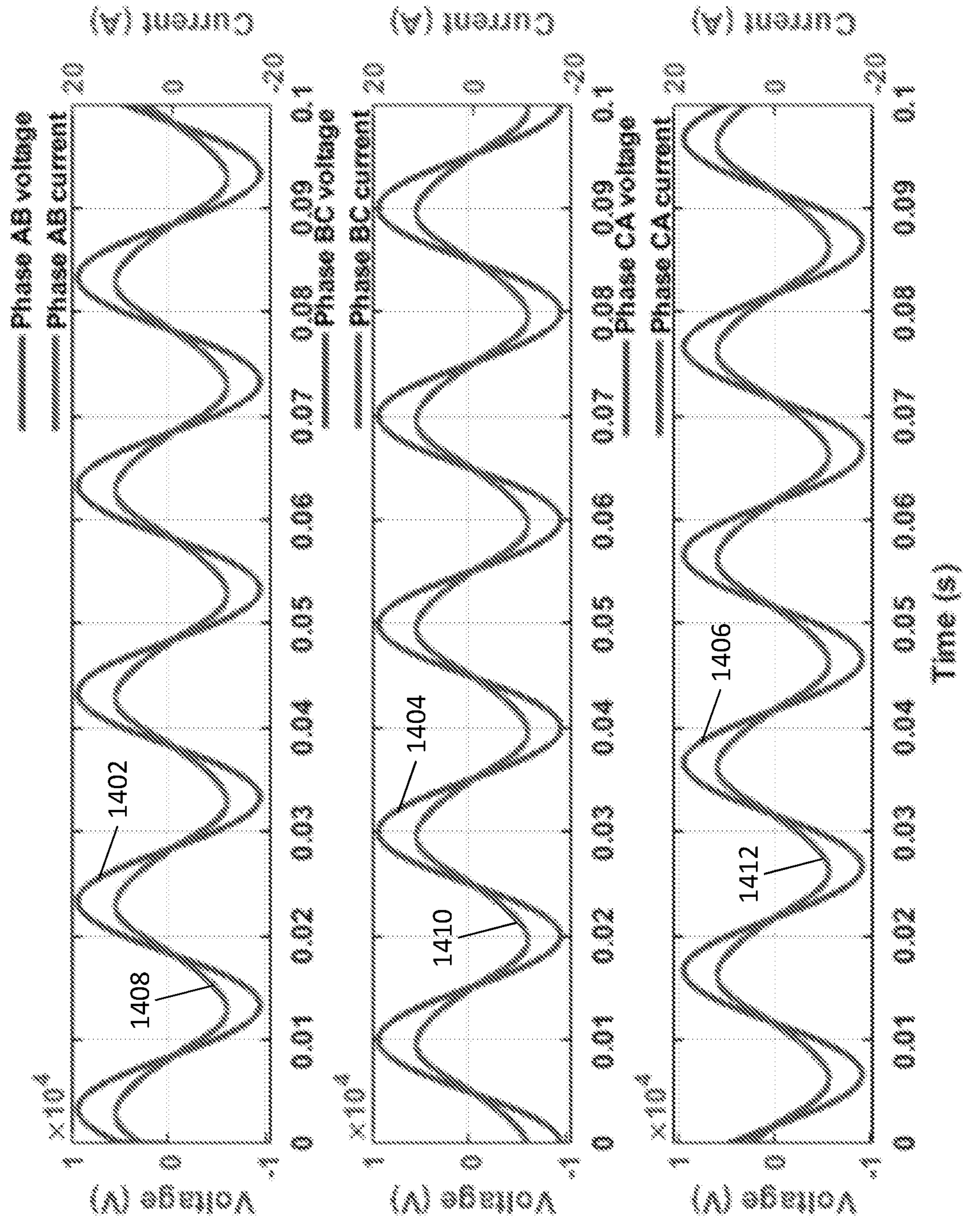
FIG. 14 shows waveforms of three-phase input voltages and currents of a MMC at rated output power.

FIG. 14 shows the three-phase input voltages (Phase AB voltage 1402, Phase BC voltage 1404, Phase CA voltage 1406) and currents (Phase AB current 1408, Phase BC current 1410, Phase CA current 1412) of the MMC at rated power. The power factor is 0.998 and the total demand distortion (TDD) of the currents is 4.34 %, which complies with the IEEE 519 standard of harmonic regulation.

Figure 15:
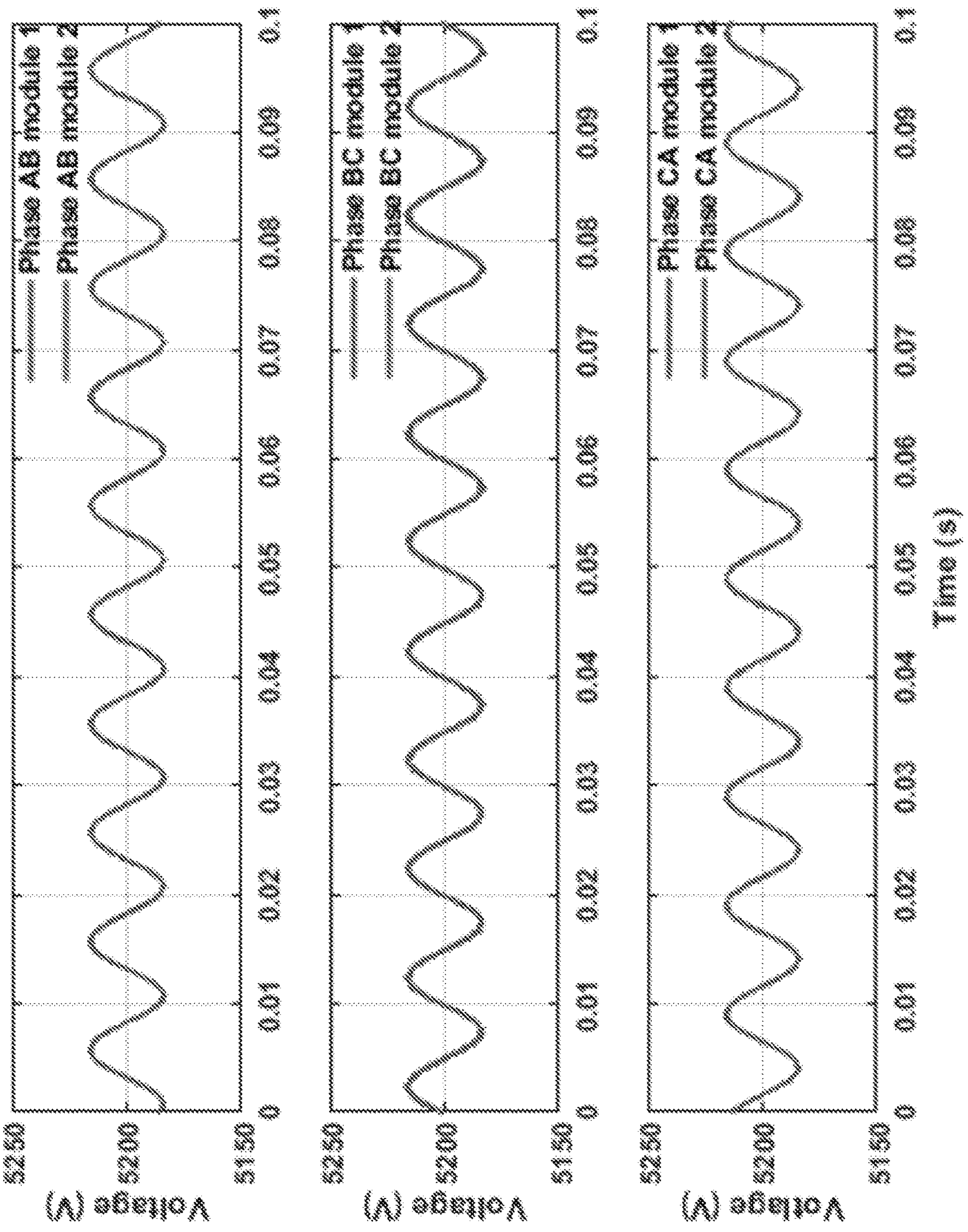
FIG. 15 shows waveforms of DC-link voltages of rectifiers at rated output power.
Figure 16:
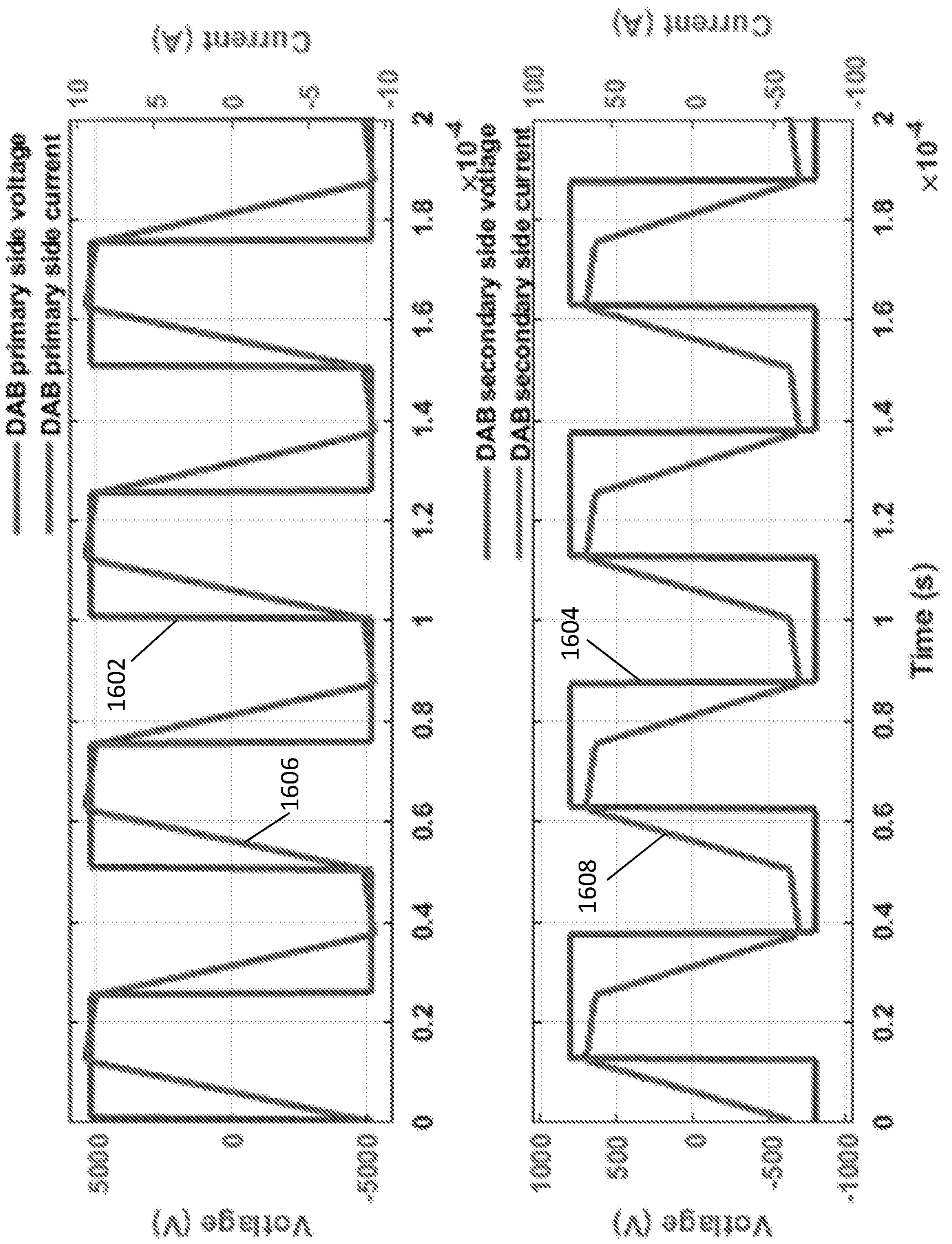
FIG. 16 shows waveforms of primary-side and secondary-side voltages and currents of a single DAB module at rated output power.

The DC-Link voltages of the three-phase rectifiers are shown in FIG. 15. The peak-to-peak voltage ripples are less than 0.5% for all six full-bridge modules, indicating good regulation of the DC-Link voltages at the rated output power. FIG. 16 displays the primary-side and secondary-cyber voltages (DAB primary side voltage 1602 and DAB secondary side voltage 1604) and currents (DAB primary side current 1606 and DAB secondary side current 1608) of a single DAB module. An obvious phase delay of the secondary-side voltage with respect to the primary-side voltage can be observed, enabling power delivery from the primary side to the secondary side.

Figure 17:
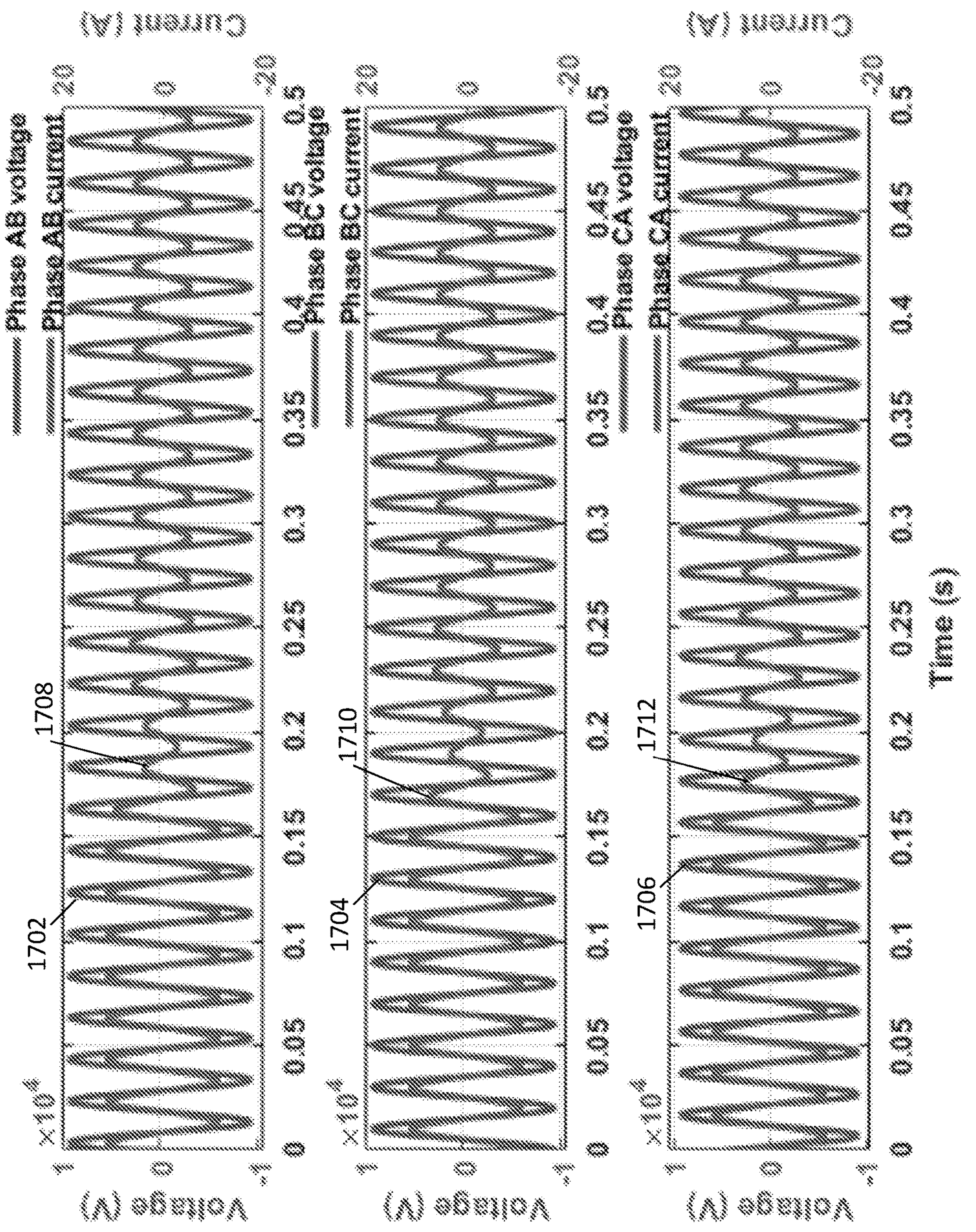
FIG. 17 shows waveforms of the three-phase input voltages and currents of the MMC when the power changes from full load to half load at t=0.15 s.
Figure 18:
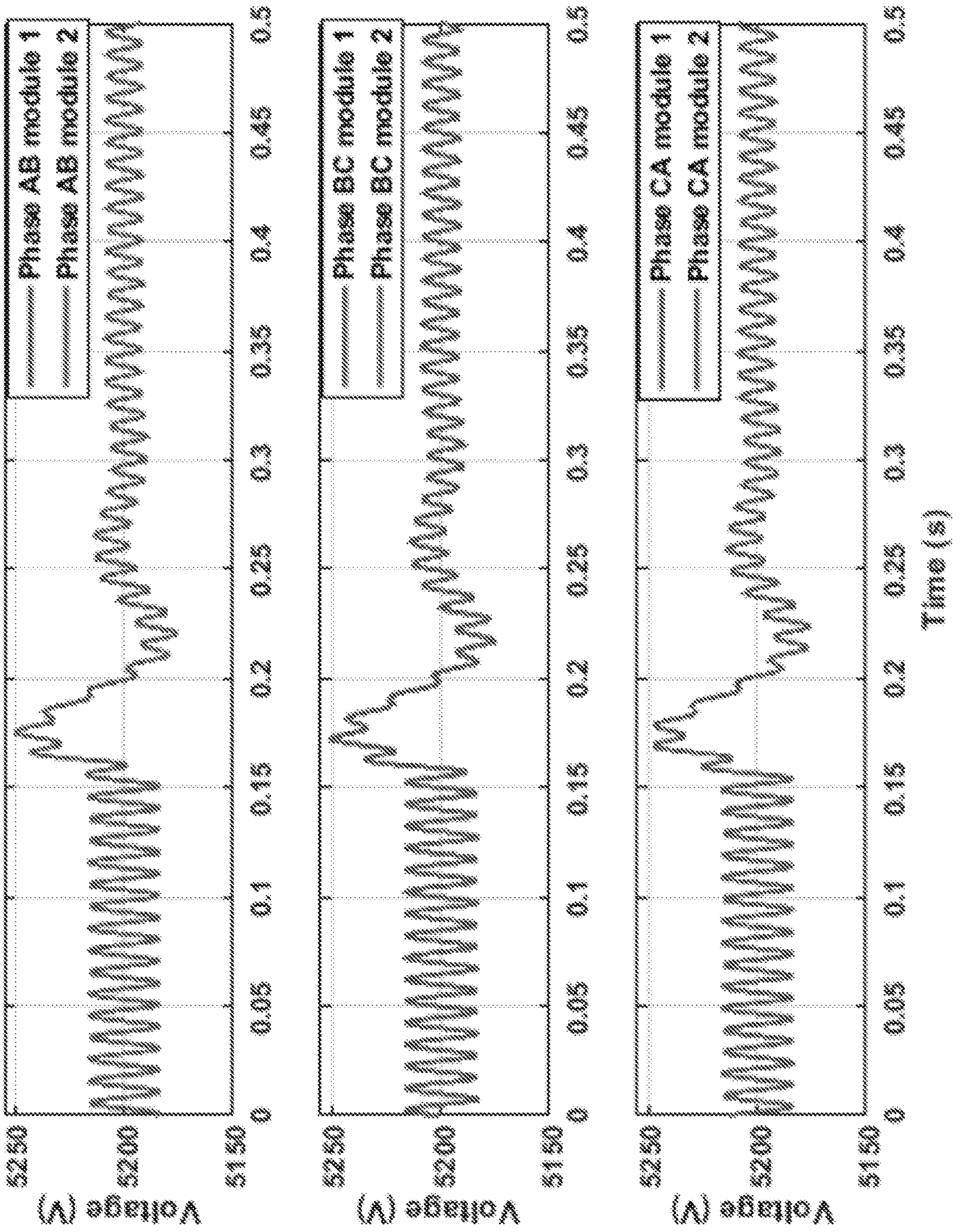
FIG. 18 shows waveforms of the DC-Link voltages of the rectifiers when the power changes from full load to half load at t=0.15 s.

Next, transient performance of input power factor and output DC voltage control of the ES-based MMC is investigated. In the second converter test, the output power of the AC-DC power converter is changed from 150 kW to 75 kW at t=0.15 s. The simulation waveforms are shown in FIGS. 17 and 18. FIG. 17 shows the three-phase input voltages (Phase AB voltage 1702, Phase BC voltage 1704, Phase CA voltage 1706) and currents (Phase AB current 1708, Phase BC current 1710, Phase CA current 1712) of the MMC. Unity power factor is maintained in both the full-load and half-load conditions. The DC-Link voltages of the three-phase rectifiers are displayed in FIG. 18. These voltages are well maintained within 5200±50 V during the transient operation. FIG. 17 and FIG. 18 indicate that the rectifiers reach steady-state in around 0.2 seconds.

Figure 19:
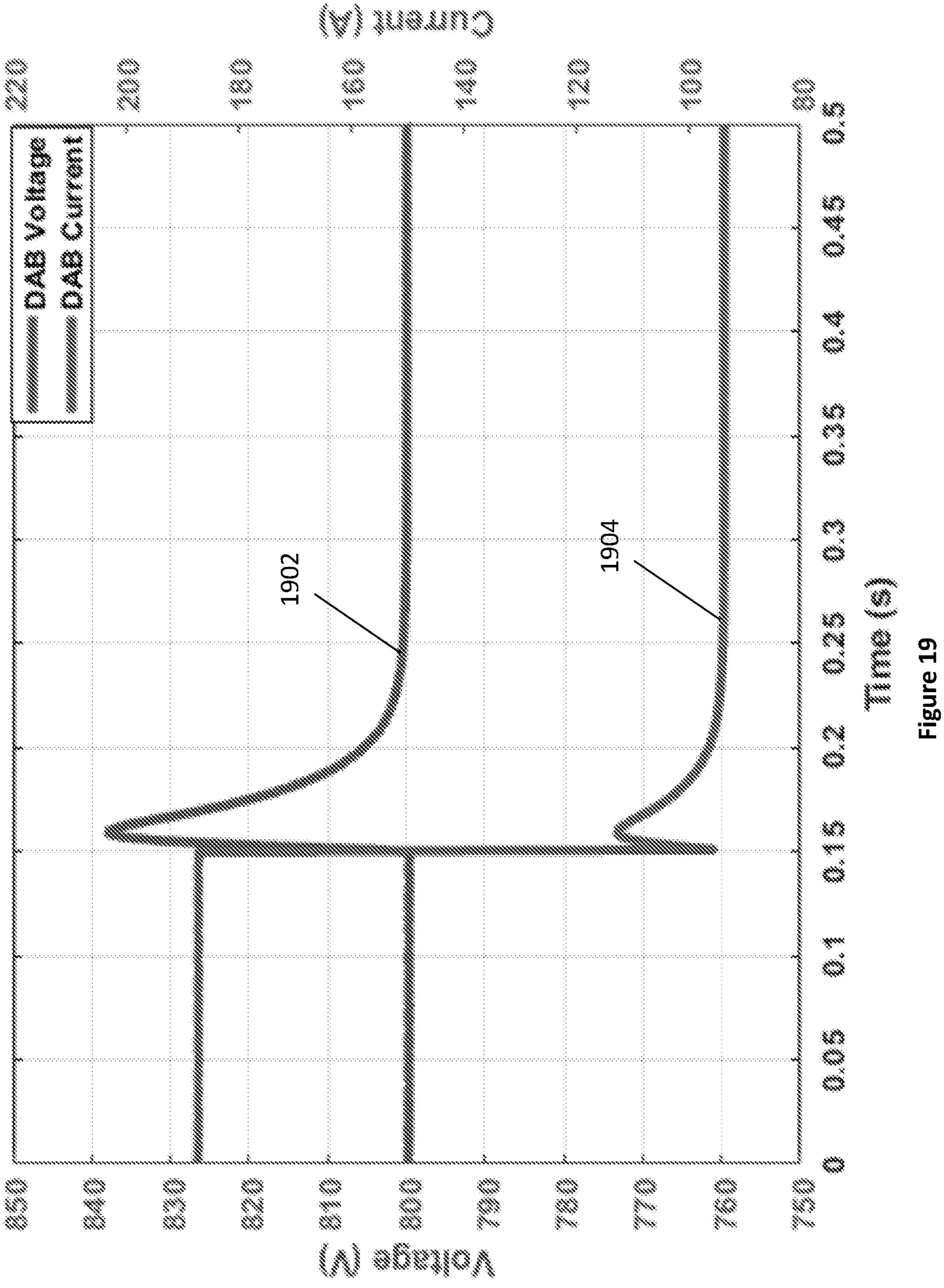
FIG. 19 shows waveforms of the output voltage and current of the MMC when the power changes from full load to half load at t=0.15 s.

FIG. 19 illustrates the output voltage 1902 and current 1904 of the AC-DC power converter system. It can be observed that a spike appears in the output voltage 1902 at the transient instant. Nonetheless, the voltage spike is less than 5% of the nominal value and the output voltage 1902 returns to 800 V in 0.1 seconds. The result verifies that the output voltage of the AC-DC power converter system is well regulated.

Figure 21:
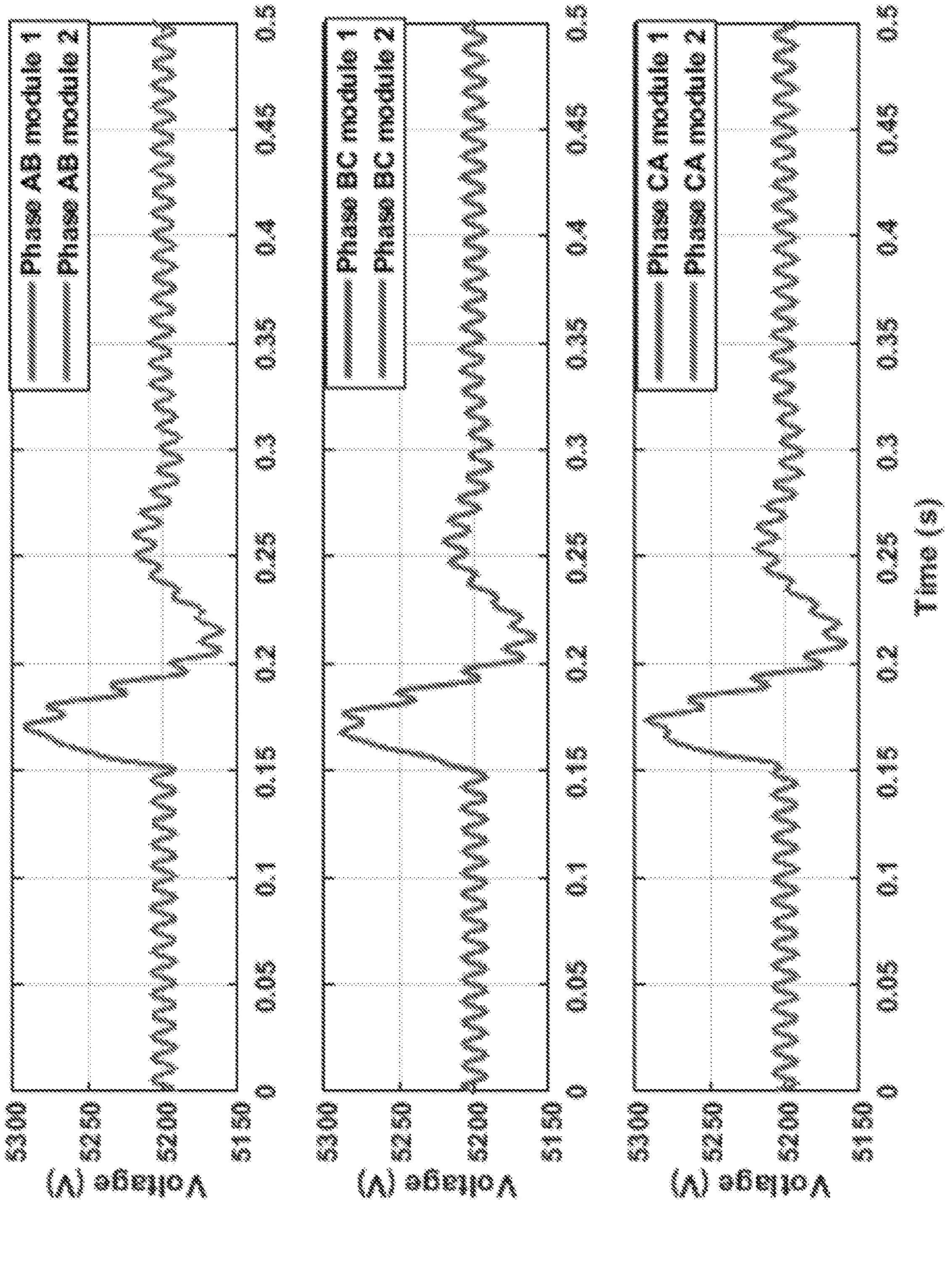
FIG. 21 shows waveforms of the DC-Link voltages of the rectifiers in the reversible-power-flow test.
Figure 22:
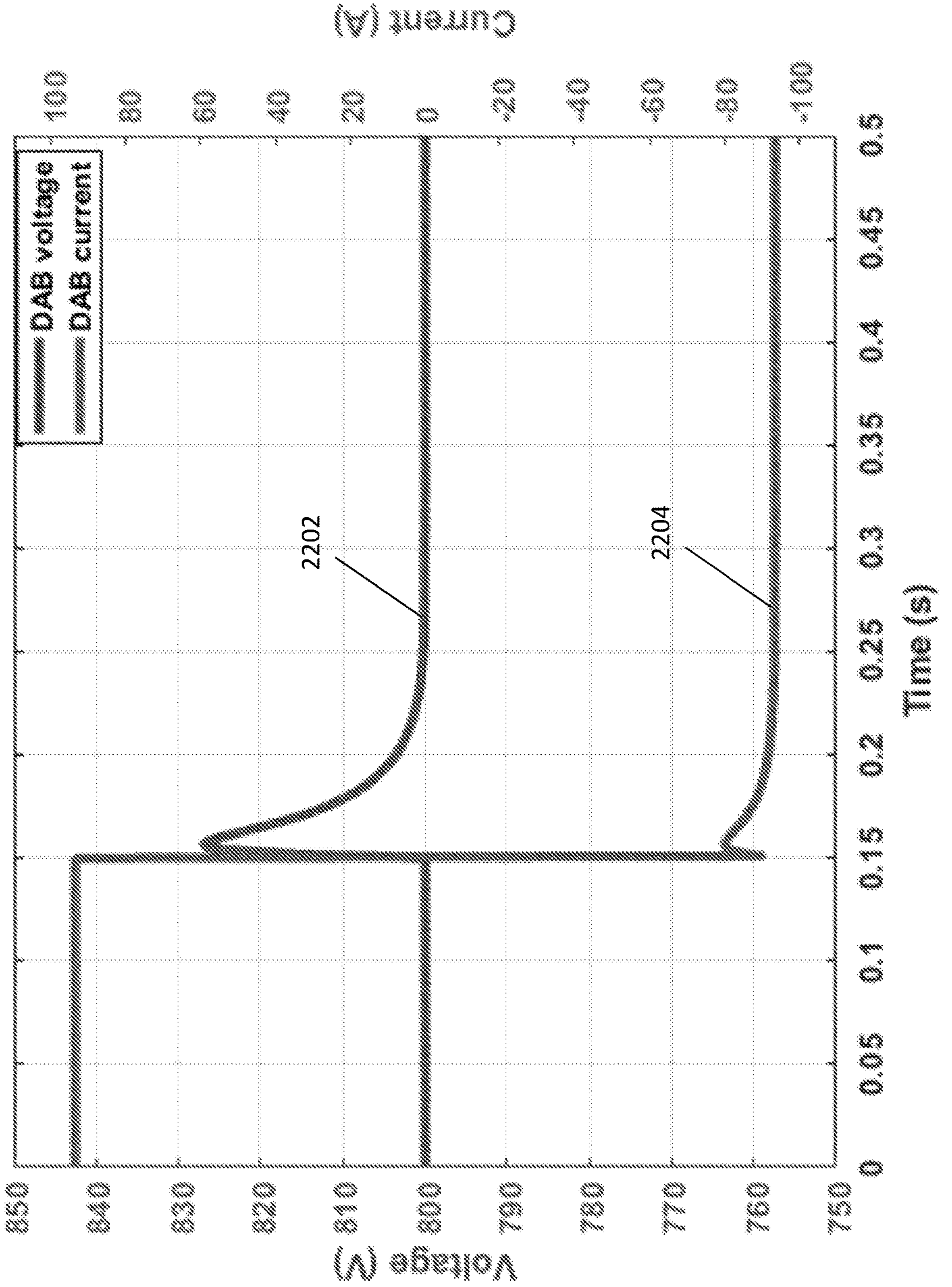
FIG. 22 shows waveforms of the output voltage and current of the MMC in the reversible-power-flow test.

Next, bidirectional-power-flow operation of the ES-based MMC with both input power factor and output DC voltage control is investigated. In this converter test, the AC-DC power converter system initially draws 75 kW of power from the AC grid to charge the DC battery load. At t=0.15 seconds, the direction of the power flow is reversed and the AC-DC power converter system feeds the power of 75 kW back into the AC grid by discharging the battery. The simulation waveforms are shown in FIGS. 20 to 22.

Figure 20:
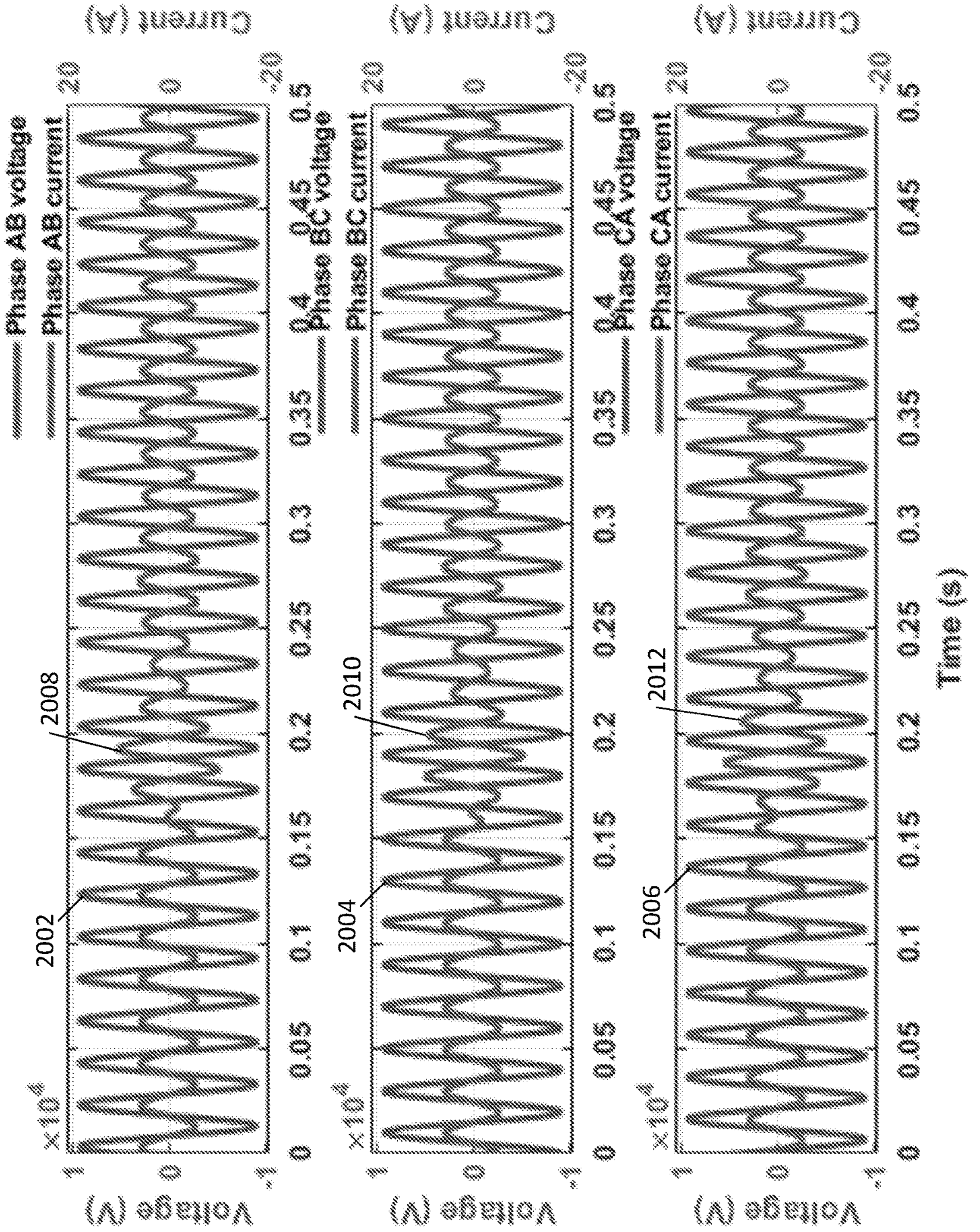
FIG. 20 shows waveforms of the three-phase input voltages and currents of the MMC in the reversible-power-flow test.

In this regard, FIG. 20 shows the three-phase input voltages (Phase AB voltage 2002, Phase BC voltage 2004, Phase CA voltage 2006) and currents (Phase AB current 2008, Phase BC current 2010, Phase CA current 2012) of the MMC. The voltage and current of each phase are initially in phase, respectively. After t=0.16 s they become out of phase, indicating the reverse change of the power flow direction. The power factor keeps unity throughout the whole process. FIG. 21 shows the output voltage and current of the AC-DC power converter system. They are kept within ±2% of the nominal value and reach steady-state in about 0.3 seconds. FIG. 22 shows the output voltage 2202 and current 2204 of the AC-DC power converter system. The output current 2204 changes from +93 A to −93 A at t=0.15 s, confirming the change of the battery operating mode from charging to discharging. Voltage spike of 26 V can be observed in the output voltage 2202. Nonetheless, the output voltage 2202 is controlled back to its nominal value after 0.1 seconds. These results verify the effectiveness of the proposed converter system structure and the controller design.

Figure 23:
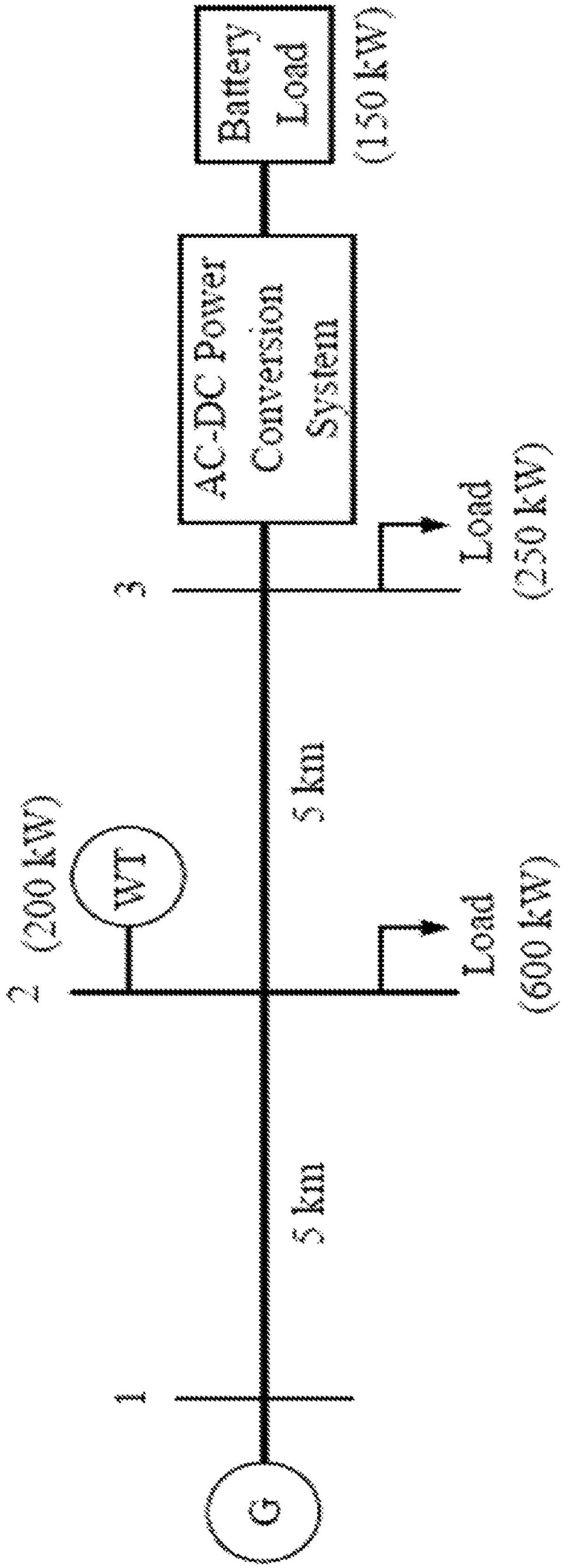
FIG. 23 schematically illustrates a 6.6 kV 3-bus AC microgrid.

Next the AC-microgrid to DC-power grid system interactions are examined through the ES-based MMC. FIG. 23 shows a 6.6 kV 3-bus AC microgrid for illustration of the ES functions of the MMC. The microgrid comprises a generator G on Bus 1, a wind turbine WT and a resistive load on Bus 2, and an MMC-fed battery load and a resistive load on Bus 3. There are two 5 km distribution lines between Bus 1 and Bus 2 and between Bus 2 and Bus 3, respectively. The wire resistance and inductance of the distribution line are 0.237Ω/km and 1.064 mH/km, respectively. The initial power of each element is also marked in FIG. 23.

Figure 24:
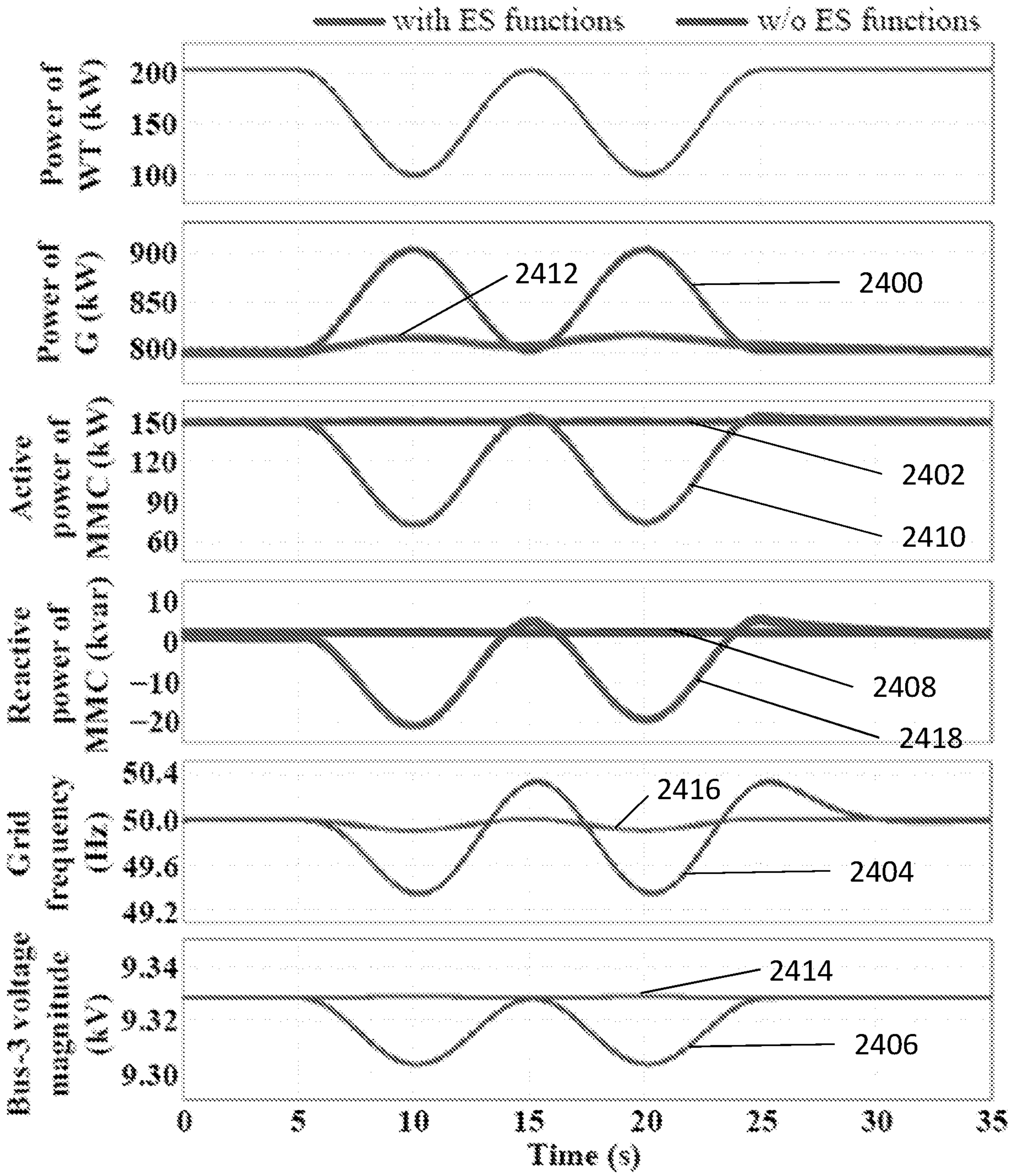
FIG. 24 shows simulation waveforms of the first scenario using ES-based AC-DC MMC to stabilise the power grid with fluctuating renewable power.

Two scenarios are considered in a simulation study. In the first scenario, consideration is given to microgrid stabilisation by ES against power fluctuations of renewable power. In the first system test, the output power of the wind turbine begins to fluctuate between 100 kW and 200 kW on a sinusoidal fashion from t=five seconds. This power fluctuation has a period of 10 seconds and lasts for 20 seconds. The simulation waveforms without and with ES functions are compared in FIG. 24.

The power fluctuation of the wind turbine (first plot of FIG. 24) causes the power generated to alter its output. Without ES functions, the output power of the generator swings significantly (as indicated by reference numeral 2400) when the load consumption remains constant (as indicated by reference numeral 2402). As a result, the grid frequency swings from 49.4 Hz to 50.3 Hz (as indicated by reference numeral 2404). Moreover, the bus voltages in the microgrid are also disturbed by the fluctuating wind power (as indicated by reference numeral 2406). The reactive power of the MMC remains constant (as indicated by reference numeral 2408) because there is no ES function.

With ES functions activated, the power consumption of the MMC-fed load is adaptive to the wind power fluctuation (as indicated by reference numeral 2410) to dynamically compensate the power change in the microgrid. This fast DSM significantly mitigates the power fluctuation of the generator (see reference numeral 2412) and stabilises the voltage and frequency of the microgrid (see references 2414 and 2416). The ES functions are illustrated in the active and reactive power compensation is provided on the AC side of the MMC (as indicated by reference numeral is 2410 and 2418) to regulate the AC grid frequency and voltage, respectively. As a result, the variation of the grid frequency is reduced to 49.9 to 50.0 Hz and the fluctuation of the Bus-3 voltage magnitude is largely mitigated to 1 V. The results in FIG. 24 verify that the ES control of the MMC can effectively regulate its input and the grid frequency.

Figure 25:
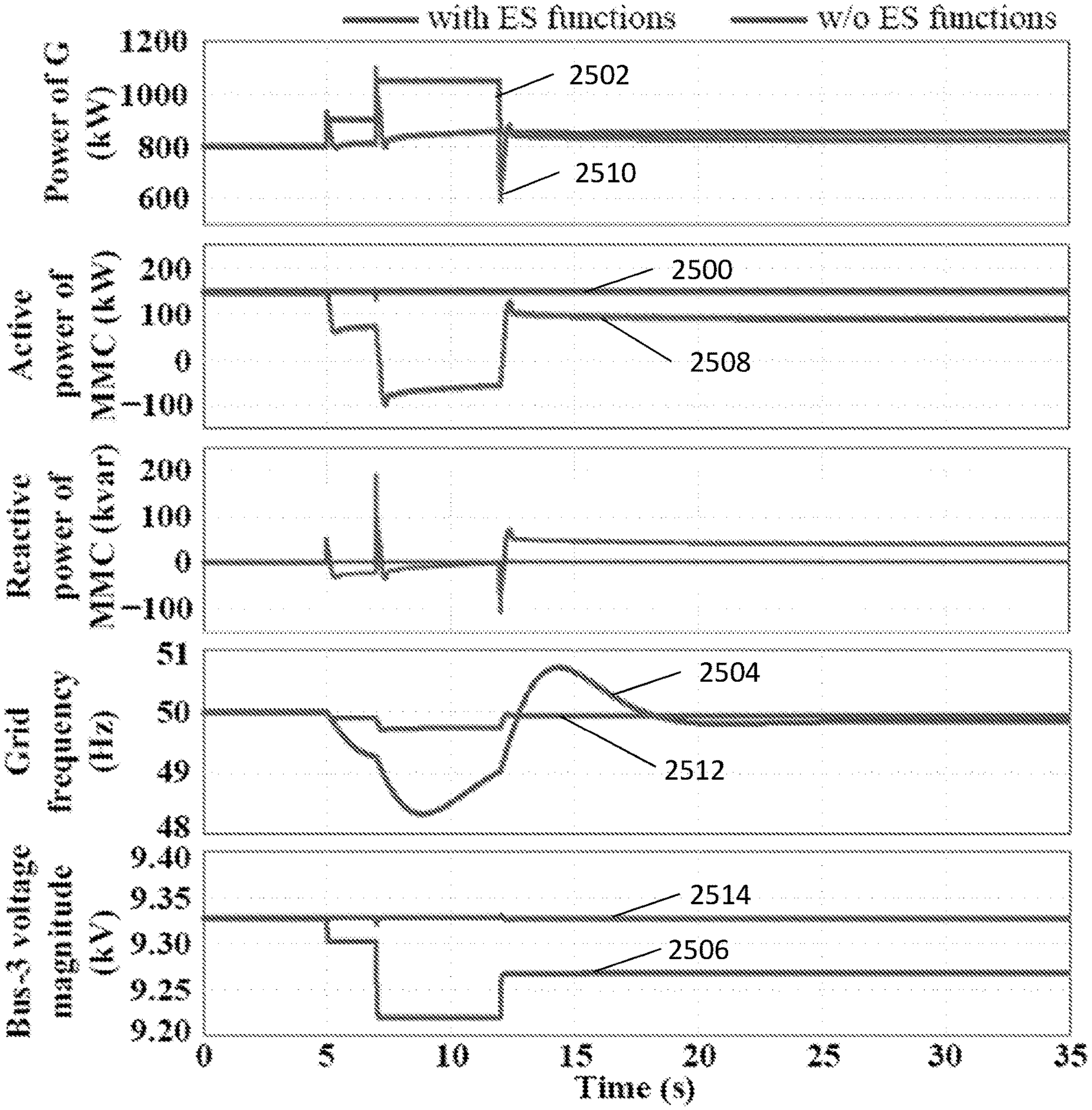
FIG. 25 shows simulation waveforms of a second scenario using ES-based MMC to stabilise power grid with both fluctuating renewable power and sudden load change.

In the second scenario, consideration is given to grid stabilisation by ES against power fluctuations of renewable power and sudden load change. To evaluate the ES functions, the second power system test involves both power fluctuations of renewables and a large load change. The wind power drops from 200 kW to 100 kW at t=5 s, and then rises to 300 kW at t=12 s. The resistive load on Bus 3 also increases from 250 kW to 400 kW at t=7 s. FIG. 25 presents the simulation waveforms.

Without ES functions, the battery load consumes constant power (see reference numeral 2500 in FIG. 25). When the wind power drops at t=5 s, the generator power has to increase (see reference numeral 2502) to feed the constant battery load. But the governor control fails to regulate the grid frequency within a tight tolerance. As shown by reference numeral 2504 in FIG. 25, the grid frequency temporarily drops to about 49.2 Hz from 5 seconds to 7 seconds. When the load demand increases at 7 seconds, the grid frequency drops further to 48.3 Hz. When the wind power rises to 300 kW at 12 seconds, the grid frequency rises to 50.7 Hz. Such a large frequency deviation can exceed the acceptable range in some countries (e.g. 49.5 Hz to 50.5 Hz in the UK). In addition, there is a voltage drop of 110 V (1.2%) on Bus 3 (see reference numeral 2506), which is undesirable.

With ES functions activated, the battery load consumes power adaptively as indicated by reference numeral 2508. This fast DSM absorbs most of the power fluctuation of the wind turbine and reduces the power variation of the generator, as shown in by reference numeral 2510. Consequently, the frequency variation ranges significantly narrowed down to 49.7 to 50.0 Hz (see reference numeral 2512) and the Bus-3 voltage magnitude is successfully maintained around its nominal level (see reference numeral 2514). The ES actions are illustrated in the active and reactive power in the second and third plots of FIG. 25 respectively. The active power of the bidirectional AC-DC MMC drops below zero between t=7 s and t=12 s, indicating that the MMC temporarily reverses its power flow direction and operates as a power source to supply the frequency stability of the AC microgrid. The reactive power provided by the ES-based MMC is successful in maintaining the voltage stability. The effectiveness of the MMC with ES functions in voltage and frequency control in the microgrid is once again verified.

Figure 26:
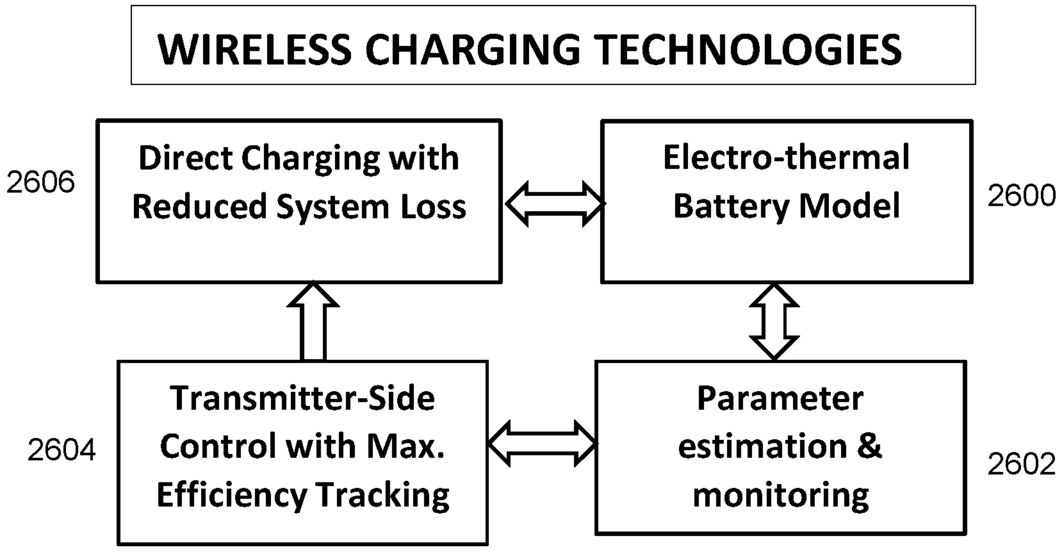
FIG. 26 is a diagram illustrating the application of the system of FIG. 1*b*.

FIG. 26 illustrates an example of wireless charging control for EV charging. The EV battery can be modelled as an electro-thermal battery model 2600. This model can be mathematically transferred to the transmitter (primary) side of a wireless charging system. This enables control to be positioned on either the transmitter (primary) or receiver (secondary) circuit. If the electro-thermal battery model can be transferred to the transmitter (primary) side, direct battery charging control can be achieved by using the transmitter (primary) circuit. This is called direct charging, because there is no need to have a separate charging control on the receiver (secondary) side. If the separate charging control in the receiver side can be eliminated, the system power loss can be reduced. Thus circuit parameters can be estimated (2602) based on the model 2600. Transmitter-side control can be implemented (2604). Transmitter-side control may include tracking the maximum efficiency or conditions such as battery charge and discharge level monitoring. This control scheme facilitates direct charging (2606) with reduced losses compared with receiver-side control schemes.

The present systems and methods involve a bidirectional AC-DC power converter system with electric spring functions installed on the AC side of a distribution voltage network. The systems can generate a DC voltage link for a DC power grid directly from the distribution network of an AC power grid. The concept is demonstrated with the use of an MMC with DAB modules. Because of the modular nature, the power capability of the proposed AC-DC power converter system is expandable based on the parking capacity of a multi-storey car park. With the bidirectional power flow capability and electric spring functions (i.e. active and reactive power compensation control on the AC side of the AC-DC power converter system) the proposed solution can mitigate frequency and voltage fluctuation of the AC power grid and therefore unable power companies to adopt more renewable energy generation.

An important application example of embodiments of this invention is to enable a power company to increase the power supply capability of existing buildings (such as multistorey carparks with no space for traditional mains-frequency transformers) to develop large-scale electric vehicle charging infrastructure. The smart EV charging infrastructure, with the help of the proposed bidirectional AC-DC power converter, can absorb power fluctuations arising from renewable energy sources so that the power company can increase the use of renewable power without causing power system instability. As such, embodiments of the invention can be used to equip existing buildings with a DC power grid that can feed large electric loads such as a large electric vehicle charging network or infrastructure. It can bypass the use of mains-frequency transformers that are bulky, because existing buildings not previously designed to have large-scale EV charging infrastructure most likely do not have space for more mains-frequency transformers.

The modular feature of embodiments of the invention enables the power supply capability in existing or to-be-built buildings to be expanded according to the number of EV chargers required in the buildings. It has the potential of helping power companies such as SP Group to set up large EV charging infrastructure in multistorey carparks in Singapore.

Like the European Union and the U.K., the Singapore government announced the Green Plan 2030 in March 2021 with the objectives of increasing the use of renewable energy and electric vehicles. Embodiments of the invention have two distinct advantages that fit into this Green Plan. Firstly, they enable a power company to equip existing multi-storey carparks with a DC power grid for feeding the EV charging infrastructure. Secondly, they provide electric spring functions. Electric spring is a power electronic technology that emulates the function of a mechanical spring to absorb fluctuations and provide support for the AC power system. As described above, electric spring technology enables the AC-DC power converter to sense the input AC voltage and mains frequency, and then provides active and reactive power compensation with the electric load to mitigate the fluctuations in the AC input voltage and mains frequency of the power system.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word “comprise”, and variations such as “comprises” and “comprising”, will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimd is:

1. A system for stabilizing a power distribution network supplied at least partially by a renewable energy source, comprising:

a bidirectional AC-DC power conversion system between a supply side distribution network and a load side grid, for converting a supply side AC voltage, at a supply side frequency, to a load side DC voltage;

a voltage regulator for regulating the load side DC voltage; and a supply side control loop comprising at least one of a frequency control loop and a voltage control loop for making a measurement of a respective one of the supply side frequency and the supply side AC voltage, and controlling bidirectional power transmission between the bidirectional AC-DC power conversion system and one or more DC loads connected to the load side grid, based on the measurement from the respective frequency control loop and/or voltage control loop; and one or more controllers for controlling power conversion in the bidirectional AC-DC power conversion system, wherein the one or more controllers are configured to increase power transmission to the one or more DC loads if the supply side frequency, determined from a measurement made by the frequency control loop, is higher than a nominal mains frequency.

2. The system of claim 1, wherein the supply side control loop comprises both the frequency control loop and the voltage control loop.

3. The system of claim 1, wherein the supply side control loop is configured to draw power from the one or more DC loads into the load side grid to stabilise at least one of the supply side AC voltage and supply side frequency.

4. The system of claim 1, wherein the supply side control loop comprises the voltage control loop and controls the supply side AC voltage by controlling reactive power generation of the bidirectional AC-DC power conversion system.

5. The system of claim 1, wherein the supply side control loop comprises the frequency control loop and controls the supply side frequency by controlling power consumption through the bidirectional AC-DC power conversion system.

6. The system of claim 1, wherein the one or more DC loads comprise electric vehicle batteries of respective one or more electric vehicles connected to the load side grid.

7. The system of claim 6, wherein the load side grid comprises one or more microgrids each corresponding to a respective parking infrastructure building, each load of the one or more DC loads being a load in a respective parking infrastructure building.

8. The system of claim 7, further comprising, for each microgrid, a controller for controlling bidirectional power transmission to the one or more microgrids.

9. The system of claim 8, further comprising a load side control distributor for separately controlling the controllers to manage bidirectional power transmission at each of the one or more microgrids in accordance with one or more control conditions.

10. The system of claim 1, wherein the bidirectional AC-DC power conversion system comprises:

a first stage, being a bidirectional AC-DC power conversion stage in communication with the supply side distribution network, with controllable bidirectional power flow, in communication with the supply side control loop, for providing electric spring function of active and/or reactive power compensation by regulating one or both of supply side AC voltage and supply side frequency;

a second stage, being a bidirectional DC-AC power conversion stage in communication with the first stage, for performing voltage step-down for power flowing from the supply side distribution network to the load side grid, and voltage step-up for power flowing from the load side grid to the supply side distribution network; and a third stage, being a bidirectional AC-DC power conversion stage in communication with the second stage and the load side grid, in communication with the voltage regulator for regulating the load side DC voltage feeding the one or more DC loads or drawing power from the one or more DC loads.

11. The system of claim 10, further comprising a transformer system between the second stage and third stage for feeding an AC-voltage between the second stage and third stage depending on a power transmission direction through the MMC.

12. The system of claim 10, wherein the first stage comprises a plurality of multilevel power converters or modular multilevel converters.

13. The system of claim 10, wherein the second stage comprises a voltage-step-down power inverter.

14. The system of claim 11, wherein the transformer system comprises a plurality of secondary windings arranged in a polyphase to form one or more AC voltage sources for the third stage.

15. The system of claim 10, further comprising a controller for reducing power imbalance over the first stage, second stage and third stage.

16. The system of claim 2, wherein the frequency control loop and voltage control loop measure the supply side frequency and supply side AC voltage, and provide active and reactive power compensation and control variation of load power consumption through a load side control loop to:

reduce instability in the supply side frequency and supply side AC voltage; or mitigate power fluctuations based on a power profile of the renewable source.

17. A control method for controlling a system according to claim 1, comprising:

reducing transmission of power to the one or more DC loads if the supply side frequency, determined from a first measurement made by the frequency control loop, is less than the nominal mains frequency;

making a second measurement of the supply side frequency using the frequency control loop; and transmitting power from the one or more DC loads to the supply side distribution network if the supply side frequency, determined from the second measurement, remains below the nominal mains frequency.

18. A method for stabilizing a power distribution network supplied at least partially by a renewable energy source, the method comprising:

arranging a bidirectional AC-DC power conversion system between a supply side distribution network and a load side grid, for converting a supply side AC voltage, at a supply side frequency, to a load side DC voltage;

using a voltage regulator for regulating the load side DC voltage;

using a supply side control loop comprising at least one of a frequency control loop and a voltage control loop for making a measurement of a respective one of the supply side frequency and the supply side AC voltage, and controlling bidirectional power transmission between the bidirectional AC-DC power conversion system and one or more DC loads connected to the load side grid, based on the measurement from the respective frequency control loop and/or voltage control loop; and using one or more controllers for controlling power conversion in the bidirectional AC-DC power conversion system, comprising increasing power transmission to the one or more DC loads if the supply side frequency, determined from a measurement made by the frequency control loop, is higher than a nominal mains frequency.

19. The system of claim 1, wherein the bidirectional AC-DC power conversion system comprises:

a first stage, being a bidirectional AC-DC power conversion stage in communication with the supply side distribution network, with controllable bidirectional power flow, in communication with the supply side control loop, for providing electric spring function of active and/or reactive power compensation by regulating one or both of supply side AC voltage and supply side frequency;

a second stage, being a bidirectional DC-AC power conversion stage in communication with the first stage, for performing voltage step-down for power flowing from the supply side distribution network to the load side grid, and voltage step-up for power flowing from the load side grid to the supply side distribution network; and a third stage, being a bidirectional AC-DC power conversion stage in communication with the second stage and the load side grid, in communication with the voltage regulator for regulating the load side DC voltage feeding the one or more DC loads or drawing power from the one or more DC loads.

20. A system for stabilizing a power distribution network supplied at least partially by a renewable energy source, comprising:

a bidirectional AC-DC power conversion system between a supply side distribution network and a load side grid, for converting a supply side AC voltage, at a supply side frequency, to a load side DC voltage;

a voltage regulator for regulating the load side DC voltage; and a supply side control loop comprising at least one of a frequency control loop and a voltage control loop for making a measurement of a respective one of the supply side frequency and the supply side AC voltage, and controlling bidirectional power transmission between the bidirectional AC-DC power conversion system and one or more DC loads connected to the load side grid, based on the measurement from the respective frequency control loop and/or voltage control loop; and one or more controllers for controlling power conversion in the bidirectional AC-DC power conversion system, the one or more controllers being configured to:

reduce transmission of power to the one or more DC loads if the supply side frequency, determined from a first measurement made by the frequency control loop, is less than a nominal mains frequency;

make a second measurement of the supply side frequency using the frequency control loop; and transmit power from the one or more DC loads to the supply side distribution network if the supply side frequency, determined from the second measurement, remains below the nominal mains frequency.

* * * * *